(12) United States Patent
Hamasaki et al.

(10) Patent No.: US 9,416,318 B2
(45) Date of Patent: Aug. 16, 2016

(54) LIQUID CRYSTAL COMPOSITION, POLYMER, FILM, AND CHOLESTERIC LIQUID CRYSTAL

(71) Applicant: FUJIFILM Corporation, Tokyo (JP)

(72) Inventors: Ryo Hamasaki, Ashigarakami-gun (JP); Masaru Yoshikawa, Ashigarakami-gun (JP); Mitsuyoshi Ichihashi, Ashigarakami-gun (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 14/615,979

(22) Filed: Feb. 6, 2015

(65) Prior Publication Data

US 2015/0152332 A1    Jun. 4, 2015

Related U.S. Application Data

(63) Continuation of application No. PCT/JP2013/070848, filed on Aug. 1, 2013.

(30) Foreign Application Priority Data

Aug. 7, 2012    (JP) .................................. 2012-174633

(51) Int. Cl.
| | | |
|---|---|---|
| C09K 19/54 | (2006.01) | |
| C09K 19/58 | (2006.01) | |
| C09K 19/38 | (2006.01) | |
| C09K 19/34 | (2006.01) | |
| C09K 19/04 | (2006.01) | |
| C09K 19/20 | (2006.01) | |

(52) U.S. Cl.
CPC ........... *C09K 19/588* (2013.01); *C09K 19/3491* (2013.01); *C09K 19/3814* (2013.01); *C09K 19/54* (2013.01); *C09K 2019/0448* (2013.01); *C09K 2019/2078* (2013.01)

(58) Field of Classification Search
CPC ...... C09K 19/54; C09K 19/588; C09K 19/38; C09K 2019/0448; C09K 2019/2078
See application file for complete search history.

(56) References Cited

U.S. PATENT DOCUMENTS

| 8,426,626 | B2 | 4/2013 | Takaku | |
|---|---|---|---|---|
| 2010/0019199 | A1* | 1/2010 | Farrand | ................. C07D 327/10 252/299.61 |
| 2010/0105937 | A1 | 4/2010 | Takaku | |

FOREIGN PATENT DOCUMENTS

| JP | 2009-533360 A | 9/2009 |
|---|---|---|
| JP | 2010-132650 A | 6/2010 |
| WO | WO 2007/115639 A1 | 10/2007 |

OTHER PUBLICATIONS

Japanese Office Action for Japanese Application No. 2012-174633, dated Nov. 24, 2015, with a partial English translation.
"Liquid Crystal Device Handbook," edited by 142nd Committee of Japan Society for Promotion of Science, chiral agent for STN, 1989, chapter 3, paragraph 4-3, p. 199.
Drabowicz et al., "Racemic and Optically Active 1, 1'-Binaphthyl-2,2'-diyl Sulfite: Synthesis, Crystal Structure, and Ring-Opening Reactions with Selected Nucleophiles," Heteroatom Chemistry, 2011, vol. 22, No. 3/4, pp. 562-570.
International Search Report issued in PCT/JP2013/070848, mailed on Nov. 5, 2013.
PCT/ISA/237—Issued in PCT/JP2013/070848, mailed on Nov. 5, 2013.
Yumoto et al., "Study of Photosensitive Chiral Compounds for Cholesteric Liquid Crystals Directed toward the Color Filter for Liquid Crystal Display," Fujifilm Research & Development, 2005, No. 50, pp. 60-63.
English excerpt of "Liquid Crystal Device Handbook," edited by 142nd Committee of Japan Society for Promotion of Science, chiral agent for STN, 1989, chapter 3, paragraph 4-3, p. 199.
English excerpt of Yumoto et al., "Study of Photosensitive Chiral Compounds for Cholesteric Liquid Crystals Directed toward the Color Filter for Liquid Crystal Display," Fujifilm Research & Development, 2005, No. 50, pp. 60-63.
International Preliminary Report on Patentability with English translation thereof (Forms PCT/IB/338, PCT/IB/373, PCT/ISA/237 and PCT/IB/326), dated Feb. 19, 2015, issued in International Application No. PCT/JP2013/070848.

* cited by examiner

*Primary Examiner* — Shean C Wu
(74) *Attorney, Agent, or Firm* — Birch, Stewart, Kolasch & Birch, LLP

(57) ABSTRACT

A liquid crystal composition containing an optically active compound represented by the following formula (1) and a liquid crystal compound shows a cholesteric liquid crystal phase having an excellent alignment state:

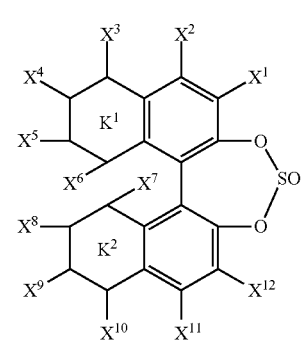

Formula (1)

$K^1$ and $K^2$ represent benzene, cyclohexane or cyclohexene; $X^1$ to $X^{12}$ represent hydrogen, halogen, alkyl, alkynyl, alkenyl or alkyloxy.

15 Claims, No Drawings

LIQUID CRYSTAL COMPOSITION, POLYMER, FILM, AND CHOLESTERIC LIQUID CRYSTAL

CROSS-REFERENCE TO RELATED APPLICATIONS

This application is a continuation application of International Application No. PCT/JP2013/070848, filed Aug. 1, 2013, which in turn claims the benefit of priority from Japanese Application No. 2012-174633, filed Aug. 7, 2012, the disclosures of which Applications are incorporated by reference herein in their entirety.

BACKGROUND OF THE INVENTION

1. Field of the Invention

The present invention relates to a liquid crystal composition, a polymer, a film, and a cholesteric liquid crystal.

2. Background Art

An optically active compound (hereinafter, also referred to as a chiral agent) induces a helical twist in a liquid crystal or can be used as a dopant strengthening the helical twist.

Here, as an index indicating the performance of a chiral agent, HTP is generally used. HTP is an abbreviation for Helical Twisting Power and is a factor for indicating helical alignment ability represented by the following formula (1). Specifically, the description thereof is included in "*Development of Light Reactive Chiral Agent for Cholesteric Liquid Crystal for Color Filter Used for Liquid Crystal Display*" (Fujifilm Research & Development, No. 50, pp. 60 to 63, Masatoshi YUMOTO and Mitsuyoshi ICHIHASHI).

HTP=Refractive index of liquid crystal/(reflection wavelength×concentration of chiral agent)  Formula (1)

As an application example of a liquid crystal using a chiral agent, an infrared reflective film obtained by laminating a specific phase difference film using, for example, a cholesteric liquid crystal phase and a reflective circular polarizing plate is known. In order to prepare a light reflective film with high performance, it is necessary to reduce haze of a film and to control a reflection wavelength bandwidth with high precision.

For example, a method of adding a chiral agent to a liquid crystal compound (for example, a rod-like liquid crystal compound) showing a cholesteric liquid crystal phase, adjusting the additive concentration of the chiral agent, and adjusting a reflection bandwidth is generally used for reflecting light having a long wavelength in an infrared light region. In this case, qualitatively, it is necessary to reduce the amount of the chiral agent to be added for shifting the reflection wavelength to the long wavelength side. Next, the alignment of the cholesteric liquid crystal phase needs to be improved for reducing the haze of the film. In this manner, alignment defects of the light reflective film can be eliminated and the haze thereof can be lowered. Accordingly, it is desired that the reflection wavelength be adjusted by using a small amount of the chiral agent with high HTP to be added, in order to shift the reflection wavelength to the long wavelength side such that infrared light is reflected and to prepare the light reflective film with excellent alignment.

As the optically active compound, various chiral agents are known (for example, described in "*Liquid Crystal Device Handbook*," chapter 3, paragraph 4-3, TN, chiral agent for STN, pp. 199, edited by $142^{nd}$ Committee of Japan Society for Promotion of Science, in 1989). The optically active compound generally contains asymmetric carbon atoms, an axially asymmetric compound not containing asymmetric carbon atoms or a planarly asymmetric compound can be used as a chiral agent. As an example of the axially asymmetric compound or a planarly asymmetric compound, binaphthol or a derivative thereof is known. For example, Patent Document 1 discloses an example of a liquid crystal mixture using sulfuric acid ester of binaphthol which is made into a derivative as a chiral agent.

Also, as other compounds having a binaphthol skeleton, Non-Patent Document 1 discloses a synthetic method of an asymmetric catalyst and an example of using binaphthol sulfurous ester as a synthetic intermediate. However, in Non-Patent Document 1, the example of using binaphthol sulfurous ester as a chiral agent is not disclosed and application of a liquid crystal compound as a chiral agent is not described.

RELATED ART DOCUMENT

Patent Document 1: JP-T-2009-533360
Non-Patent Document 1: Heteroatom Chemistry, 2011 vol. 22, pp. 562

SUMMARY OF INVENTION

As a result of research of characteristics of the liquid crystal mixture disclosed in Patent Document 1 performed by the inventors of the present invention, since HTP of a chiral agent is low, it is necessary to add a large amount of chiral agent for controlling a cholesteric liquid crystal phase having a desired helical pitch. Accordingly, it is understood that there is insufficiency from the viewpoint of improving the alignment state.

An object of the present invention is to improve the above-described problems. That is, the object to be solved by the present invention is to provide a liquid crystal composition capable of indicating a cholesteric liquid crystal phase having an excellent alignment state using an optically active composition of a binaphthol skeleton which has high HTP.

As a result of intensive research by the inventors of the present invention for the purpose of solving the above-described problems, the inventors of the present invention found that a method of suppressing inversion by making a chiral agent circular such as a sulfuric ester derivative described in Patent Document 1 is effective as a means for improving torsional force of an axially asymmetric chiral agent of a binaphthol skeleton to obtain high HTP, but higher HTP can be obtained by using a sulfurous ester derivative as a chiral agent and thus the above-described problems can be solved.

The present invention as a means for solving the above-described problems is as follows.

[1] A liquid crystal composition containing:
an optically active compound represented by the following formula (1); and
a liquid crystal compound:

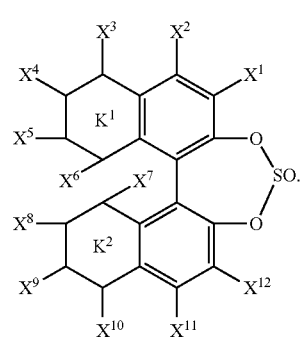

Formula (1)

In the formula (1), $K^1$ and $K^2$ each independently represent a benzene ring, a cyclohexane ring, or a cyclohexene ring, and one or more carbon atoms among carbon atoms constituting each ring may be substituted with a nitrogen atom; $X^1$ to $X^{12}$ each independently represent a hydrogen atom, a halogen atom, an alkyl group having 1 to 12 carbon atoms, an alkynyl group having 1 to 12 carbon atoms, an alkenyl group having 1 to 12 carbon atoms, or an alkyloxy group having 1 to 12 carbon atoms, and each $CH_2$ group in the alkyl group, the alkynyl group, the alkenyl group and the alkyloxy group may be independently substituted with O, S, OCO, COO, OCOO, CO, or a phenylene group.

[2] In the liquid crystal composition according to [1], it is preferable that both of $K^1$ and $K^2$ represent benzene rings in the formula (1).

[3] In the liquid crystal composition according to [1] or [2], in the formula (1), it is preferable that $X^2$, $X^3$, $X^5$ to $X^8$, $X^{10}$, and $X^{11}$ each independently represent a hydrogen atom or a fluorine atom; $X^1$, $X^4$, $X^9$, and $X^{12}$ each independently represent a hydrogen atom, a fluorine atom, a bromine atom, or an alkyl group having 1 to 12 carbon atoms, an alkynyl group having 1 to 12 carbon atoms, an alkenyl group having 1 to 12 carbon atoms, or an alkyloxy group having 1 to 12 carbon atoms, and each $CH_2$ group in the alkyl group, the alkynyl group, the alkenyl group and the alkyloxy group may be independently substituted with O, S, OCO, COO, OCOO, CO, or a phenylene group.

[4] In the liquid crystal composition according to any one of [1] to [3], in the formula (1), it is preferable that $X^1$ to $X^{12}$ each independently represent a hydrogen atom and both of $K^1$ and $K^2$ represent a benzene ring.

[5] It is preferable that the liquid crystal composition according to any one of [1] to [4] contain at least one liquid crystal compound represented by the following formula (2) as the liquid crystal compound:

Formula (2)

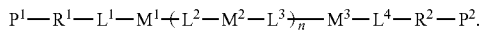

In the formula (2), $P^1$ and $P^2$ each independently represent a hydrogen atom or a polymerizable group, $R^1$ and $R^2$ each independently represent an alkylene group having 1 to 8 carbon atoms, an alkylene group having 1 to 8 carbon atoms, or an alkenylene group having 1 to 8 carbon atoms; $L^1$ to $L^4$ each independently represent a single bond, O, S, COO, OCO, OCOO, CO, $NR^3$, $NR^4CO_3$ or $CONR^5$ ($R^3$ to $R^5$ each independently represent an alkyl group having 1 to 4 carbon atoms); $M^1$ to $M^3$ each independently represent a phenylene group, a biphenylene group, a naphthylene group, a cyclohexylene group, or a cyclohexenylene group, one or more carbon atoms among carbon atoms constituting each ring may be substituted with a nitrogen atom, and a hydrogen atom on each ring may be substituted with a halogen atom, an alkyl group having 1 to 8 carbon atoms, an alkynyl group having 1 to 8 carbon atoms, an alkenyl group having 1 to 8 carbon atoms, or an alkyloxy group having 1 to 8 carbon atoms (each $CH_2$ group in the alkyl group, the alkynyl group, the alkenyl group and the alkyloxy group may be independently substituted with O, S, OCO, COO, OCOO, or CO); and n represents an integer of 1 to 3.

[6] It is preferable that the liquid crystal composition according to [5] contain at least two kinds of liquid crystal compounds represented by the formula (2) as the liquid crystal compound and both of $P^1$ and $P^2$ represent a polymerizable group in at least one kind among liquid crystal compounds represented by the formula (2).

[7] It is preferable that the liquid crystal composition according to [5] or [6] contain at least two kinds of the liquid crystal compounds represented by the following formula (2) as the liquid crystal compound and one of $P^1$ and $P^2$ represents a hydrogen atom and the other represents a polymerizable group in at least one kind among the liquid crystal compounds represented by the following formula (2).

[8] In the liquid crystal composition according to any one of [5] to [7], in the formula (2), it is preferable that at least one of $P^1$ and $P^2$ represent a polymerizable group represented by any of groups in the formula (3):

Groups of Formula (3)

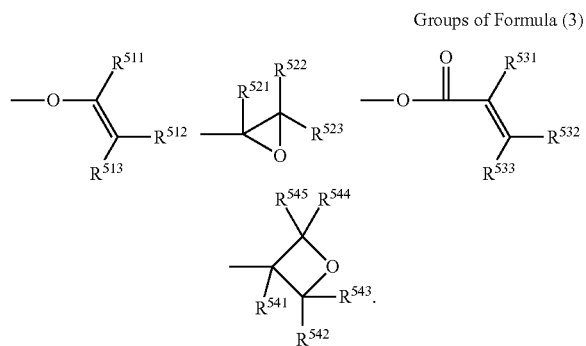

In the groups of the formula (3), $R^{511}$ to $R^{513}$, $R^{521}$ to $R^{523}$, $R^{531}$ to $R^{533}$, and $R^{541}$ to $R^{545}$ each independently represent a hydrogen atom or an alkyl group.

[9] In the liquid crystal composition according to any one of claims [5] to [8], it is preferable that at least one of $P^1$ and $P^2$ in the formula (2) be a (meth)acrylate group.

[10] In the liquid crystal composition according to any one of claims [5] to [9], it is preferable that $L^1$ to $L^4$ each independently represent O, S, COO, OCO, or OCOO in the formula (2).

[11] A polymer which is obtained by polymerizing the liquid crystal composition according to any one of [1] to [10].

[12] A film which is obtained by curing the liquid crystal composition according to any one of [1] to [10].

[13] A cholesteric liquid crystal which is formed of the liquid crystal composition according to any one of [1] to [10].

[14] A film which is obtained by fixing a cholesteric liquid crystal phase formed of the liquid crystal composition according to any one of [1] to [10].

[15] It is preferable that the film according to [12] or [14] show selective reflection characteristics.

According to the present invention, it is possible to provide a liquid crystal composition which uses an optically active compound of a binaphthol skeleton having high HTP and is capable of showing a cholesteric liquid crystal phase having an excellent alignment state.

DESCRIPTION OF EMBODIMENTS

Hereinafter, the present invention will be described in detail.

The description of the constituent elements of the present invention described below is for typical embodiments or specific examples of the present invention, but the present invention is not limited to such embodiments or specific examples. In the present specification, the numerical range expressed by the wording "a number to another number" means the range that falls between the former number indicating the lower limit of the range and the latter number indicating the upper limit thereof.

In the present specification, the solid that contains a liquid crystal compound may include crystals of the liquid crystal compound, or may be a non-crystalline amorphous solid. The solid may contain other components such as a polymerization initiator or a chiral agent. All or some of these may be mixed in the solid.

In addition, in the present specification, "(meth)acrylate" expresses acrylate and methacrylate; "(meth)acryl" expresses acryl and methacryl; and "(meth)acryloyl" expresses acryloyl and methacryloyl. Further, in the present specification, "monomer" in Chinese characters and "monomer" in Katakana have the same definition as each other. The monomer of the present invention is differentiated from an oligomer and a polymer and is a compound having a weight average molecular weight of 1000 or less.

[Liquid Crystal Composition]

The liquid crystal composition of the present invention contains an optically active compound represented by the following formula (1) and a liquid crystal compound.

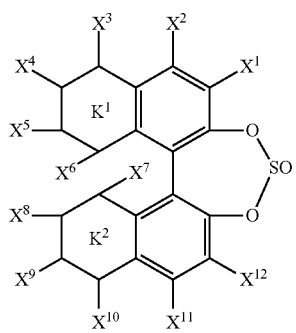

Formula (1)

In the formula (1), $K^1$ and $K^2$ each independently represent a benzene ring, a cyclohexane ring, or a cyclohexene ring, and one or more carbon atoms among carbon atoms constituting each ring may be substituted with a nitrogen atom; $X^1$ to $X^{12}$ each independently represent a hydrogen atom, a halogen atom, an alkyl group having 1 to 12 carbon atoms, an alkynyl group having 1 to 12 carbon atoms, an alkenyl group having 1 to 12 carbon atoms, or an alkyloxy group having 1 to 12 carbon atoms, and each $CH_2$ group in each group may be independently substituted with O, S, OCO, COO, OCOO, CO, or a phenylene group.

By employing such a configuration, it is possible to provide a liquid crystal composition which uses an optically active compound of a binaphthol skeleton having high HTP and is capable of showing a cholesteric liquid crystal phase with an excellent alignment state.

Hereinafter, in regard to components of the liquid crystal composition of the present invention, the optically active compound represented by the formula (1), the liquid crystal compound, and other components will be described.

<Optically Active Substance (Chiral Agent)>

The liquid crystal composition of the present invention contains the optically active compound represented by the following formula (1).

In the optically active compound represented by the formula (1) has a characteristic in which HTP is significantly increased when binaphthol or a derivative thereof is condensed as sulfurous ester, compared to a case where binaphthol or a derivative thereof is condensed as sulfuric acid ester.

A preferred configuration of the optically active compound represented by the formula (1) is described.

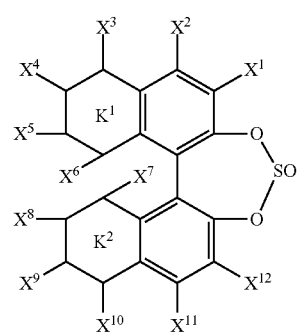

Formula (1)

In the formula (1), $K^1$ and $K^2$ each independently represent a benzene ring, a cyclohexane ring, or a cyclohexane ring, and one or more carbon atoms among carbon atoms constituting each ring may be substituted with a nitrogen atom.

It is preferable that $K^1$ and $K^2$ each independently represent a benzene ring or a cyclohexane ring, particularly preferable that $K^1$ and $K^2$ each independently represent a benzene ring, and more particularly preferable that both of $K^1$ and $K^2$ represent a benzene ring.

One or more carbon atoms among carbon atoms constituting each ring represented by $K^1$ and $K^2$ may be substituted with a nitrogen atom, and it is preferable that 0 to 2 carbon atoms constituting each ring be substituted with a nitrogen atom, more preferable that 0 or 1 carbon atom be substituted with a nitrogen atom, and particularly preferable that no carbon atom be substituted with a nitrogen atom.

In the formula (1), $X^1$ to $X^{12}$ each independently represent a hydrogen atom, a halogen atom, an alkyl group having 1 to 12 carbon atoms, an alkynyl group having 1 to 12 carbon atoms, an alkenyl group having 1 to 12 carbon atoms, or an alkyloxy group having 1 to 12 carbon atoms, and each $CH_2$ group in each group may be independently substituted with O, S, OCO, COO, OCOO, CO, or a phenylene group.

Here, in a case where a $CH_2$ group in an alkyl group having 1 to 12 carbon atoms, an alkynyl group having 1 to 12 carbon atom, an alkenyl group having 1 to 12 carbon atoms, or an alkyloxy group having 1 to 12 carbon atoms is substituted with O, S, OCO, COO, OCOO, CO, or a phenylene group, the position of a $CH_2$ group to be substituted may be a terminal of each group or in the inside of each group. For example, when an alkyl group having one carbon atom is substituted with a phenylene group, $X^1$ to $X^{12}$ each substantially represent a phenyl group; when an alkyl group having 3 carbon atoms is substituted with CO, $X^1$ to $X^{12}$ each substantially represent an ethyl carbonyl group; and when an alkyl group having 4 carbon atoms is substituted with S, $X^1$ to $X^{12}$ each substantially represent a propylthio group, but these substituents are all included in $X^1$ to $X^{12}$ satisfying the formula (1).

Examples of an alkyl group having 1 to 12 carbon atoms in which a $CH_2$ group is not substituted include a linear, branched or cyclic alkyl group, a methyl group, an ethyl group, a propyl group, a butyl group, a pentyl group, a hexyl group, a heptyl group, an octyl group, a nonyl group, a decyl group, an undecyl group, a dodecyl group, and a cyclohexyl group.

Examples of an alkyl group having 1 to 12 carbon atoms in which a $CH_2$ group is substituted with O include 2-oxapropyl (=methoxymethyl), 2-oxabutyl (=ethoxymethyl), or 3-oxabutyl (=2-methoxyethyl), 2-, 3-, or 4-oxapentyl, 2-, 3-, 4-, or 5-oxahexyl, 2-, 3-, 4-, 5-, or 6-oxaheptyl, 2-, 3-, 4-, 5-, 6-, or 7-oxaoctyl, 2-, 3-, 4-, 5-, 6-, 7-, or 8-oxanonyl, and 2-, 3-, 4-, 5-, 6-, 7-, 8-, or 9-oxadecyl.

Examples of an alkyl group having 1 to 12 carbon atoms in which a $CH_2$ group is substituted with S include a methylthio group, an ethylthio group, a propylthio group, a butylthio group, a pentylthio group, a hexylthio group, a heptylthio group, an octylthio group, a nonylthio group, a decylthio group, and an undecylthio group.

As an alkyl group having 1 to 12 carbon atoms in which a $CH_2$ group is substituted with OCO or COO, a linear group having 2 to 6 carbon atoms is preferable. Specific examples thereof include acetyloxy, propionyloxy, butyloxy, pentanoyloxy, hexanoyloxy, acetyloxymethyl, propionyloxymethyl, butyryloxymethyl, pentanoyloxymethyl, 2-acetyloxyethyl, 2-propionyloxyethyl, 2-butyryloxyethyl, 3-acetyloxypropyl, 3-propionyloxypropyl, 4-acetyloxybutyl, methoxycarbonyl, ethoxycarbonyl, propoxycarbonyl, butoxycarbonyl, pentoxycarbonyl, methoxycarbonylmethyl, ethoxycarbonylmethyl, propoxycarbonylmethyl, but oxycarbonylmethyl, 2-(methoxycarbonyl)ethyl, 2-(ethoxycarbonyl)ethyl, 2-(propoxycarbonyl)ethyl, 3-(methoxycarbonyl) propyl, 3-(ethoxycarbonyl) propyl, and 4-(methoxycarbonyl)-butyl.

An alkyl group having 1 to 12 carbon atoms in which a $CH_2$ group is substituted with OCOO may be linear or branched and is preferably linear, and a known group can be used.

Examples of an alkyl group having 1 to 12 carbon atoms in which a $CH_2$ group is substituted with CO include a carbonyl methyl group, a carbonyl ethyl group, a carbonyl propyl group, a carbonyl butyl group, a carbonyl pentyl group, a carbonyl hexyl group, a carbonyl heptyl group, a carbonyl octyl group, a carbonyl nonyl group, a carbonyl decyl group, and a carbonyl undecyl group.

Examples of an alkyl group having 1 to 12 carbon atoms in which a $CH_2$ group is substituted with a phenylene group include a phenyl group.

Further, a $CH_2$ group in an alkyl group having 1 to 12 carbon atoms, an alkynyl group having 1 to 12 carbon atoms, an alkenyl group having 1 to 12 carbon atoms, or an alkyloxy group having 1 to 12 carbon atoms may be substituted with plural same kinds or different kinds of O, S, OCO, COO, OCOO, CO, or a phenylene group.

Examples of an alkyl group having 1 to 12 carbon atoms in which a $CH_2$ group is substituted with plural same kinds or different kinds of O, S, OCO, COO, OCOO, CO, or a phenylene group include an alkyl phenyl carbonyl group, an alkyl phenyloxy carbonyl group, an alkyl phenyl carbonyloxy group, an alkoxy phenyl carbonyl group, an alkoxy phenyloxy carbonyl group, an alkoxy phenyl carbonyloxy group, an alkylthio phenyl carbonyl group, an alkylthio phenyloxy carbonyl group, an alkylthio phenyl carbonyloxy group.

Examples of an alkynyl group having 1 to 12 carbon atoms in which a $CH_2$ group may be substituted with O, S, OCO, COO, OCOO, CO, or a phenylene group include an ethynyl group, a 1-propynyl group, a 2-propynyl group, a 1-butynyl group, a 2-butynyl group, a 3-butynyl group, a 1-ethynyl-2-propynyl group, a 1-methyl-2-propynyl group, a pentynyl group, a hexynyl group, a heptynyl group, an octynyl group, a nonynyl group, a decynyl group, an undecynyl group, a dodecynyl group, and a cyclooctynyl group. Further, a group obtained by removing hydrogen on a triple bond is preferable and examples thereof include an ethylnyl group, a 2-propynyl group, a 3-butynyl group, a 4-pentynyl group, a 5-hexynyl group, a 6-heptynyl group, a 7-octynyl group, a 8-nonynyl group, a 9-decynyl group, a 10-undecynyl group, and a 11-dodecynyl group.

An alkenyl group having 1 to 12 carbon atoms in which a $CH_2$ group may be substituted with O, S, OCO, COO, OCOO, CO, or a phenylene group may be linear or branched and is preferably linear, and examples thereof include vinyl, prop-1- or prop-2-enyl; but-1-, -2-, or but-3-enyl; pent-1-, -2-, -3-, or pent-4-enyl; hex-1-, -2-, -3-, -4-, or hex-5-enyl; hept-1-, -2-, -3-, -4-, -5-, or hept-6-enyl; oct-1-, -2-, -3-, -4-, -5-, -6-, or oct-7-enyl; non-1-, -2-, -3-, -4-, -5-, -6-, -7-, or non-8-enyl; and dec-1-, -2-, -3-, -4-, -5-, -6-, -7-, -8-, or dec-9-enyl. More examples thereof include -1E-alkenyl having 2 to 7 carbon atoms, -3E-alkenyl having 4 to 7 carbon atoms, -4-alkenyl having 5 to 7 carbon atoms, -5-alkenyl having 6 to 7 carbon atoms, -6-alkenyl having 7 carbon atoms, particularly, -1E-alkenyl having 2 to 7 carbon atoms, -3E-alkenyl having 4 to 7 carbon atoms, and -4-alkenyl having 5 to 7 carbon atoms. Particularly preferred examples of the alkenyl group include vinyl, 1E-propenyl, 1E-butenyl, 1E-pentenyl, 1E-hexenyl, 1E-heptenyl, 3-butenyl, 3E-pentenyl, 3E-hexenyl, 3E-heptenyl, 4-pentenyl, 4Z-hexenyl, 4E-hexenyl, 4Z-heptenyl, 5-hexenyl, and 6-heptenyl. A group having up to 5 carbon atoms is generally preferable.

Examples of an alkyloxy group having 1 to 12 carbon atoms include a methoxy group, an ethoxy group, a propioxy group, a butoxy group, a pentoxy group, a hexoxy group, a heptoxy group, an octoxy group, a nonoxy group, a decoxy group, an undecoxy group, and a dodecoxy group.

In the liquid crystal composition of the present invention, in the formula (1), $X^2$, $X^3$, $X^5$ to $X^8$, $X^{10}$, and $X^{11}$ each independently preferably represent a hydrogen atom, a fluorine atom, or a bromine atom, more preferably represent a hydrogen atom or a fluorine atom, and particularly preferably represent a hydrogen atom.

In $X^2$, $X^3$, $X^5$ to $X^8$, $X^{10}$, and $X^{11}$, the number of substituents other than the hydrogen atom is in the range of 0 to 8, preferably in the range of 0 to 2, and more preferably 0.

In the liquid crystal composition of the present invention, in the formula (1), $X^1$, $X^4$, $X^9$, and $X^{12}$ each independently preferably represent a hydrogen atom, a fluorine atom, a bromine atom, or an alkyl group having 1 to 12 carbon atoms, an alkynyl group having 1 to 12 carbon atoms, an alkenyl group having 1 to 12 carbon atoms, or an alkyloxy group having 1 to 12 carbon atoms (each $CH_2$ group therein may be independently substituted with O, S, OCO, COO, OCOO, CO, or a phenylene group); more preferably represent a hydrogen atom, a fluorine atom, a bromine atom, or an alkyl group having 1 to 8 carbon atoms, an alkynyl group having 1 to 8 carbon atoms, an alkenyl group having 1 to 8 carbon atoms, or an alkyloxy group having 1 to 8 carbon atoms (each $CH_2$ group therein may be independently substituted with O, S, OCO, COO, OCOO, CO, or a phenylene group); and particularly preferably represent a hydrogen atom, a fluorine atom, a bromine atom, or an alkyl group having 1 to 4 carbon atoms, an alkynyl group having 1 to 4 carbon atoms, an alkenyl group having 1 to 4 carbon atoms, or an alkyloxy group having 1 to 4 carbon atoms (each $CH_2$ group therein may be independently substituted with O, S, OCO, COO, OCOO, CO, or a phenylene group).

In $X^1$, $X^4$, $X^9$ and $X^{12}$, the number of substituents other than the hydrogen atom is in the range of 0 to 4, preferably in the range of 0 to 2, and more preferably 0.

Among the examples described above, in the liquid crystal composition of the present invention, it is preferable that all of $X^1$ to $X^{12}$ in the formula (1) represent a hydrogen atom and both of $K^1$ and $K^2$ represent a benzene ring from a viewpoint of obtaining high HTP and ease of synthesis.

The optically active compound represented by the formula (1) may be an R body or an S body. Here, in a case where the film of the present invention showing the selective reflection characteristics is produced by fixing the cholesteric liquid crystal phase of the liquid crystal composition of the present invention, a structure in which mutually reverse selective reflective films are adjacent in a helical direction of the cholesteric liquid crystal phase can be obtained. Since the optically active compound represented by the formula (1) shows high HTP in either case where the optically active compound is an R body or an S body, the helix of the cholesteric liquid crystal phase of the liquid crystal composition of the present invention may be directed to the left or to the right.

Hereinafter, specific examples of the optically active compound represented by the formula (1) are described, but the present invention is not limited thereto. Further, only an R body or only an S body of the optically active compound represented by the formula (1) is exemplified in some cases, but the corresponding S body or R body can be used in the present invention.

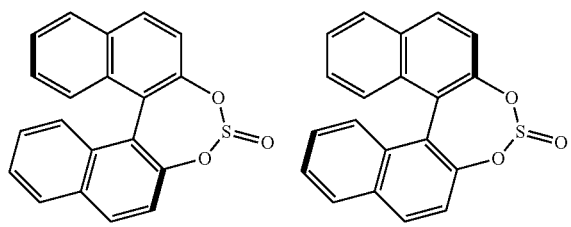

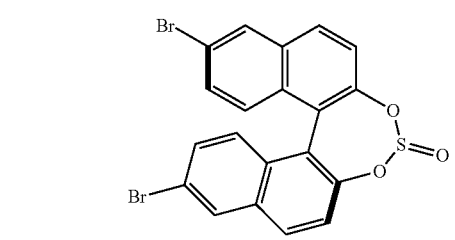

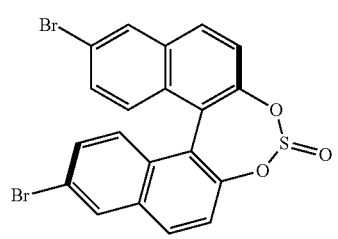

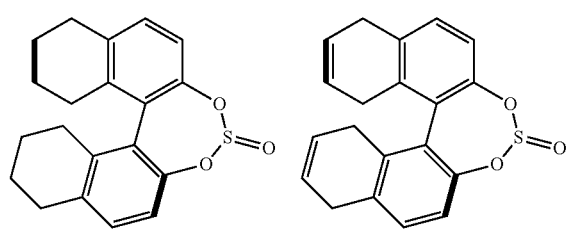

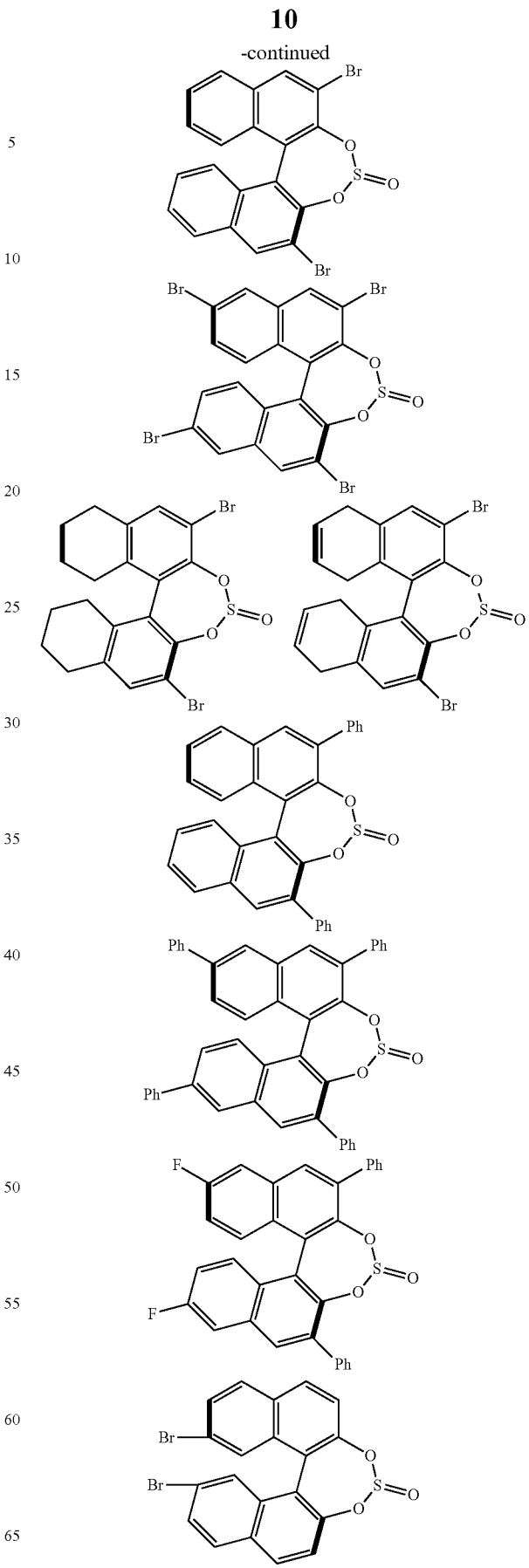

11
-continued
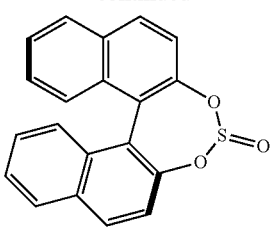
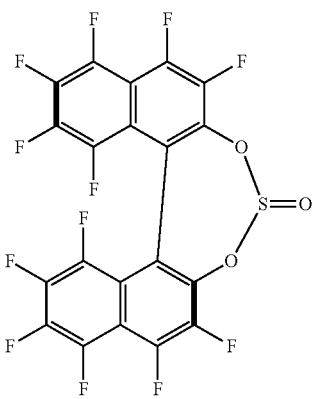
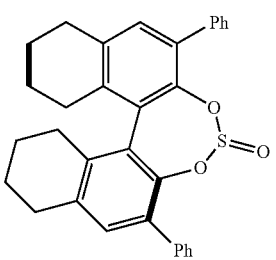
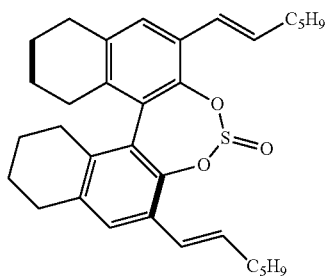
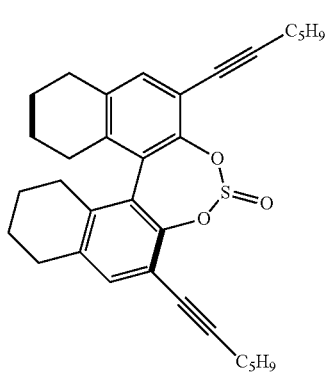
12
-continued
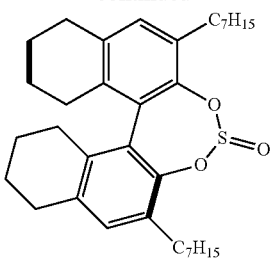
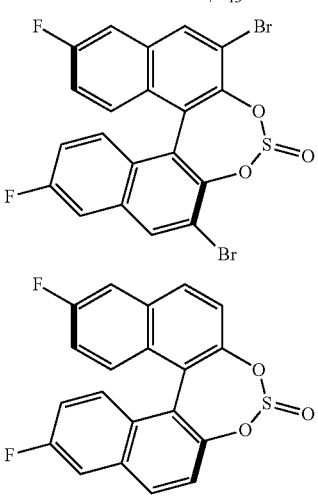
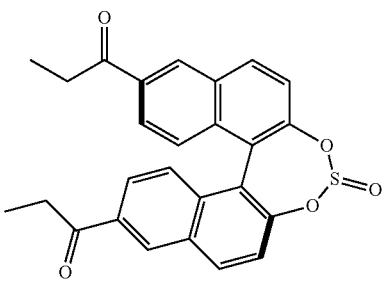
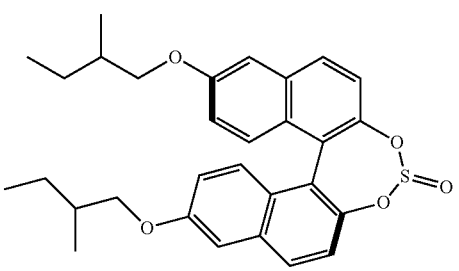
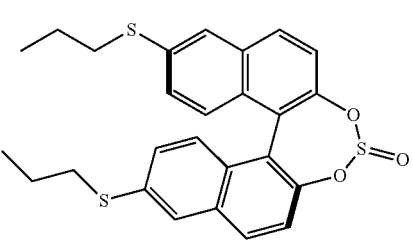

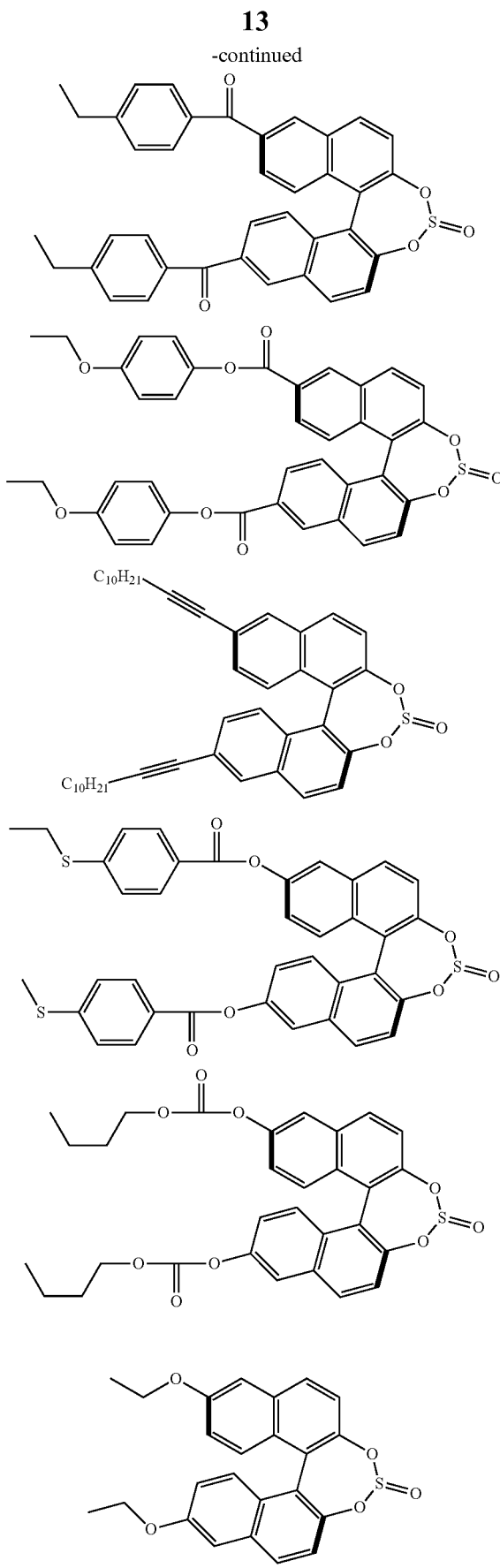
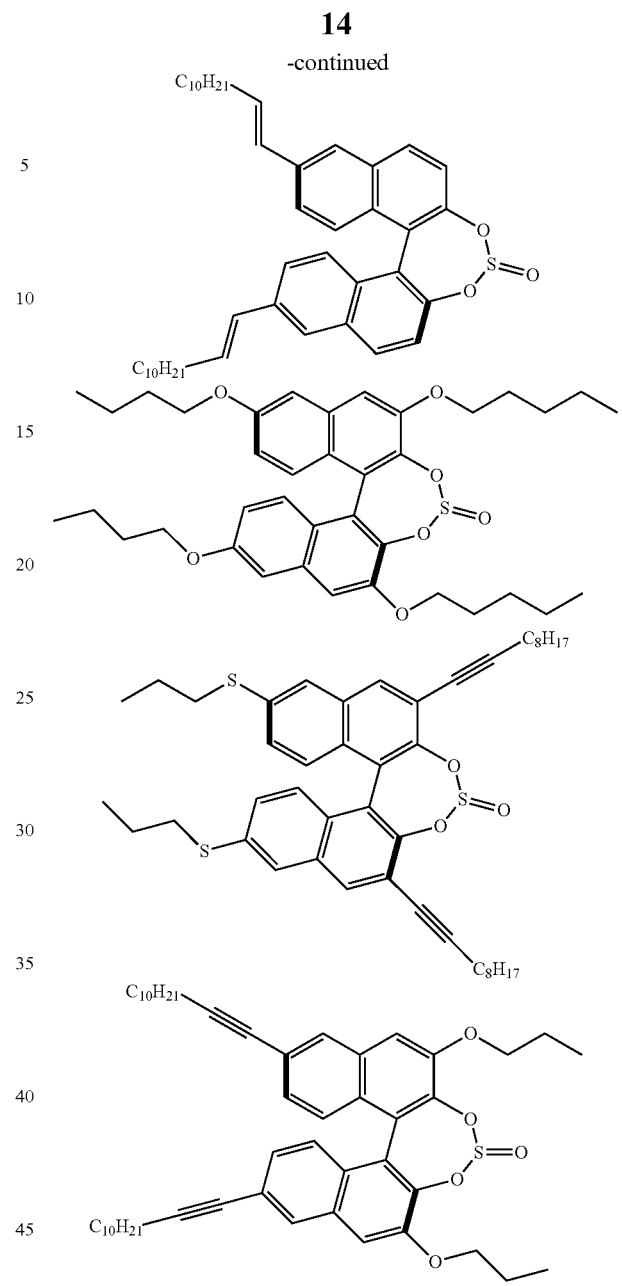

The amount of the optically active compound represented by the formula (1) in the liquid crystal compound is preferably in the range of 1% by weight to 30% by weight, more preferably in the range of 2% by weight to 20% by weight, and particularly preferably in the range of 3% by weight to 15% by weight with respect to the liquid crystal compound used together. It is preferable that the amount of the optically active compound to be used be small because liquid crystallinity is not affected by the optically active compound in many cases. Accordingly, as the optically active compound used as a chiral agent, a compound having strong torsional force is preferable so as to achieve twisted alignment of a desired helical pitch even in a small amount thereof.

The optically active compound represented by the formula (1) can be synthesized using a method described in a known literature or a similar method. For example, it is preferable that the optically active compound be synthesized using a method described in "*Heteroatom chemistry,*" 2011 vol. 22, pp. 562.

Further, an R body or an S body of the optically active compound represented by the formula (1) can be synthesized using a raw material of one of an R body and an S body as a raw material. In addition, a racemic body may be optically divided using a known method.

<Liquid Crystal Compound>

The liquid crystal composition of the present invention contains a liquid crystal compound.

It is preferable that the liquid crystal compound be a rod-like liquid crystal compound.

An example of the rod-like liquid crystal compound which can be used in the present invention is a rod-like nematic liquid crystal compound. Preferred examples of the rod-like nematic liquid crystal compound include azomethines, azoxys, cyanobiphenyls, cyanophenyl esters, benzoic acid esters, cyclohexane carboxylic acid phenyl esters, cyanophenyl cyclohexanes, cyano-substituted phenyl pyrimidines, alkoxy-substituted phenyl pyrimidines, phenyl dioxanes, trans, and alkenyl cyclohexyl benzonitriles. A high molecular liquid crystal compound as well as a low molecular liquid crystal compound can be used.

The rod-like liquid crystal compound used in the present invention may be polymerizable or non-polymerizable. The rod-like liquid crystal compound without a polymerizable group is described in various literatures (for example, Y. Goto et. al., Mol. Cryst. Liq. Cryst. 1995, Vol. 260, pp. 23 to 28).

The polymerizable rod-like liquid crystal compound can be obtained by introducing a polymerizable group into a rod-like liquid crystal compound. Examples of the polymerizable group include an unsaturated polymerizable group, an epoxy group, and an aziridinyl group. Further, an unsaturated polymerizable group is preferable and an ethylenically unsaturated polymerizable group is particularly preferable. A polymerizable group can be introduced into a molecule of a rod-like liquid crystal compound using various methods. The number of polymerizable groups included in the polymerizable rod-like liquid crystal compound is preferably in the range of 1 to 6, more preferably in the range of 1 to 3, and particularly preferably 1 or 2. Examples of the polymerizable rod-like liquid crystal compound include compounds described in Makromol. Chem., vol. 190, pp. 2255 (in 1989); Advanced Materials vol. 5, pp. 107 (in 1993), U.S. Pat. No. 4,683,327, U.S. Pat. No. 5,622,648, U.S. Pat. No. 5,770,107, WO95/22586, WO95/24455, WO97/00600, WO98/23580, WO98/52905, JP-A-1-272551, JP-A-6-16616, JP-A-7-110469, JP-A-11-80081, and JP-A-2001-328973 in addition to the liquid crystal compound represented by the following formula (2). Two kinds or more of polymerizable rod-like liquid crystal compounds may be used in combination. When two kinds or more polymerizable rod-like liquid crystal compounds are used in combination, the alignment temperature can be decreased.

It is preferable that the liquid crystal composition of the present invention contain at least one kind among liquid crystal compounds represented by the following formula (2) as the liquid crystal compound.

Formula (2)

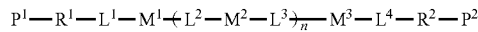

In the formula (2), $P^1$ and $P^2$ each independently represent a hydrogen atom or a polymerizable group, $R^1$ and $R^2$ each independently represent an alkylene group having 1 to 8 carbon atoms, an alkynylene group having 1 to 8 carbon atoms, or an alkenylene group having 1 to 8 carbon atoms; $L^1$ to $L^4$ each independently represent a single bond, O, S, COO, OCO, OCOO, CO, $NR^3$, $NR^4CO$, or $CONR^5$ ($R^3$ to $R^5$ each independently represent an alkyl group having 1 to 4 carbon atoms); $M^1$ to $M^3$ each independently represent a phenylene group, a biphenylene group, a naphthylene group, a cyclohexylene group, or a cyclohexenylene group, one or more carbon atoms among carbon atoms constituting each ring may be substituted with a nitrogen atom, and a hydrogen atom on each ring may be substituted with a halogen atom, an alkyl group having 1 to 8 carbon atoms, an alkynyl group having 1 to 8 carbon atoms, an alkenyl group having 1 to 8 carbon atoms, or an alkyloxy group having 1 to 8 carbon atoms (each $CH_2$ group in a substituent on each ring may be independently substituted with O, S, OCO, COO, OCOO, or CO); and n represents an integer of 1 to 3.

In the formula (2), $P^1$ and $P^2$ each independently represent a hydrogen atom or a polymerizable group. Examples of the polymerizable group include an unsaturated polymerizable group, an epoxy group, and an aziridinyl group. Further, an unsaturated polymerizable group is preferable and an ethylenically unsaturated polymerizable group is particularly preferable.

In the liquid crystal composition of the present invention, in the formula (2), it is preferable that at least one of $P^1$ and $P^2$ represent a polymerizable group represented by any of the groups in the formula (3).

Groups of Formula (3)

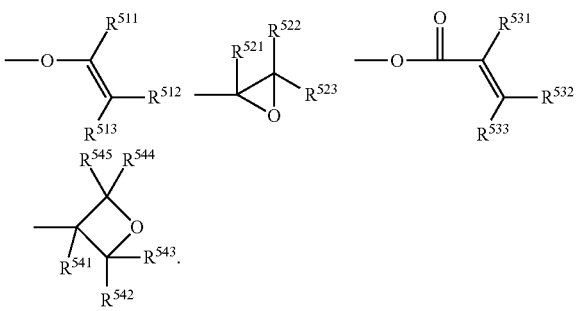

In the groups of the formula (3), $R^{511}$ to $R^{513}$, $R^{521}$ to $R^{523}$, $R^{531}$ to $R^{533}$, and $R^{541}$ to $R^{545}$ each independently represent a hydrogen atom or an alkyl group.

$R^{511}$ and $R^{513}$ each independently represent a hydrogen atom or an alkyl group (examples thereof include methyl, ethyl, n-propyl, isopropyl, n-butyl, pentyl, hexyl, heptyl, octyl, and nonyl, a lower alkyl group such as methyl or ethyl is preferable, and methyl is more preferable), and it is preferable that $R^{511}$ represent a methyl group, $R^{513}$ represent a hydrogen atom, and both of $R^{511}$ and $R^{513}$ represent a combination of hydrogen atoms.

$R^{512}$ represents a hydrogen atom, a substituted alkyl group or an unsubstituted alkyl group (examples thereof include methyl, ethyl, n-propyl, isopropyl, n-butyl, pentyl, hexyl, heptyl, octyl, nonyl, 2-chloroethyl, 3-methoxyethyl, and methoxy ethoxy ethyl, a lower alkyl group such as methyl or ethyl is preferable, and methyl is more preferable), a hydrogen atom or a lower alkyl group is preferable, and a hydrogen atom is more preferable. As a polymerizable group having $R^{511}$ to $R^{513}$, an unsubstituted vinyloxy group which is a functional group with high polymerization activity is generally preferably used.

A polymerizable group having $R^{521}$ to $R^{523}$ represents a substituted oxirane group or unsubstituted oxirane group. $R^{521}$ and $R^{522}$ each independently represent a hydrogen atom or an alkyl group (examples thereof include methyl, ethyl, n-propyl, isopropyl, n-butyl, pentyl, hexyl, heptyl, octyl, and nonyl, a lower alkyl group such as methyl or ethyl is preferable, and methyl is more preferable), and it is preferable that both of $R^{521}$ and $R^{522}$ represent a hydrogen atom.

$R^{523}$ represents a hydrogen atom, a substituted alkyl group or an unsubstituted alkyl group (examples thereof include methyl, ethyl, n-propyl, isopropyl, n-butyl, pentyl, hexyl, heptyl, octyl, nonyl, 2-chloroethyl, 3-methoxyethyl, and methoxy ethoxy ethyl, a lower alkyl group such as methyl or ethyl is preferable, and methyl is more preferable), a hydrogen atom or a lower alkyl group such as methyl, ethyl, or n-propyl is preferable.

A polymerizable group having $R^{531}$ to $R^{533}$ represents a substituted acryl group or unsubstituted acryl group. $R^{531}$ and $R^{533}$ each independently represent a hydrogen atom or an alkyl group (examples thereof include methyl, ethyl, n-propyl, isopropyl, n-butyl, pentyl, hexyl, heptyl, octyl, and nonyl, a lower alkyl group such as methyl or ethyl is preferable, and methyl is more preferable), and it is preferable that $R^{531}$ represent methyl, $R^{533}$ represent a hydrogen atom, or both of $R^{531}$ and $R^{533}$ represent a combination of hydrogen atoms.

$R^{532}$ represents a hydrogen atom, a substituted alkyl group or an unsubstituted alkyl group (examples thereof include methyl, ethyl, n-propyl, isopropyl, n-butyl, pentyl, hexyl, heptyl, octyl, nonyl, 2-chloroethyl, 3-methoxyethyl, and methoxy ethoxy ethyl, a lower alkyl group such as methyl or ethyl is preferable, and methyl is more preferable), and a hydrogen atom is preferable. Accordingly, as a polymerizable group having $R^{531}$ to $R^{533}$, a functional group with high polymerization activity such as an unsubstituted acryloxy group, a methacryloxy group, or a crotonyloxy group is generally preferably used.

A polymerizable group having $R^{541}$ to $R^{545}$ represents a substituted oxetane group or unsubstituted oxetane group. $R^{542}$, $R^{543}$, $R^{544}$, and $R^{545}$ each independently represent a hydrogen atom or an alkyl group (examples thereof include methyl, ethyl, n-propyl, isopropyl, n-butyl, pentyl, hexyl, heptyl, octyl, and nonyl, a lower alkyl group such as methyl or ethyl is preferable, and methyl is more preferable), and it is preferable that all of $R^{542}$, $R^{543}$, $R^{544}$, and $R^{545}$ represent a hydrogen atom.

$R^{541}$ represents a hydrogen atom, a substituted alkyl group or an unsubstituted alkyl group (examples thereof include methyl, ethyl, n-propyl, isopropyl, n-butyl, pentyl, hexyl, heptyl, octyl, nonyl, 2-chloroethyl, 3-methoxyethyl, and methoxy ethoxy ethyl, a lower alkyl group such as methyl or ethyl is preferable, and methyl is more preferable), a hydrogen atom or a lower alkyl group such as methyl, ethyl, or n-propyl is preferable.

In the liquid crystal composition of the present invention, it is preferable that at least one of $P^1$ and $P^2$ in the formula (2) be a (meth)acrylate group.

It is preferable that the liquid crystal composition of the present invention contain at least two kinds of the liquid crystal compounds represented by the following formula (2) as the liquid crystal compound. Further, it is more preferable that both of $P^1$ and $P^2$ in at least one kind among the liquid crystal compounds represented by the formula (2) represent a polymerizable group or one of $P^1$ and $P^2$ in at least one kind among the liquid crystal compounds represented by the formula (2) represent a hydrogen atom and the other represent a polymerizable group.

In the formula (2), $R^1$ and $R^2$ each independently represent an alkylene group having 1 to 8 carbon atoms, an alkynylene group having 1 to 8 carbon atoms, or an alkenylene group having 1 to 8 carbon atoms, preferably represent an alkylene group having 1 to 8 carbon atoms, and more preferably represent an alkylene group having 1 to 4 carbon atoms.

In the formula (2), $L^1$ to $L^4$ each independently represent a single bond, O, S, COO, OCO, OCOO, CO, $NR^3$, $NR^4CO$, or $CONR^5$ ($R^3$ to $R^5$ each independently represent an alkyl group having 1 to 4 carbon atoms).

In the liquid crystal composition of the present invention, $L^1$ to $L^4$ in the formula (2) each independently preferably represent O, S, COO, OCO, or OCOO, and more preferably represent O, COO, or OCO.

Among these, $L^1$ and $L^4$ each independently particularly preferably represent O. Meanwhile, $L^2$ and $L^3$ each independently particularly preferably represent COO or OCO.

$M^1$ to $M^3$ in the formula (2) each independently represent a phenylene group, a biphenylene group, a naphthylene group, a cyclohexylene group, or a cyclohexenylene group, one or more carbon atoms among carbon atoms constituting each ring may be substituted with a nitrogen atom, and a hydrogen atom on each ring may be substituted with a halogen atom, an alkyl group having 1 to 8 carbon atoms, an alkynyl group having 1 to 8 carbon atoms, an alkenyl group having 1 to 8 carbon atoms, or an alkyloxy group having 1 to 8 carbon atoms (each $CH_2$ group in a substituent on each ring may be independently substituted with O, S, OCO, COO, OCOO, or CO).

$M^1$ to $M^3$ each independently preferably represent a phenylene group or a cyclohexylene group and more preferably represent a phenylene group.

One or more carbon atoms among carbon atoms constituting each ring represented by $M^1$ to $M^3$ may be substituted with a nitrogen atom, and it is preferable that 0 to 3 carbon atoms be substituted with a nitrogen atom, more preferable that 0 or 1 carbon atom be substituted with a nitrogen atom, and particularly preferable that no carbon atom be substituted with a nitrogen atom.

A hydrogen atom on each ring represented by $M^1$ to $M^3$ may be substituted with a halogen atom, an alkyl group having 1 to 8 carbon atoms, an alkynyl group having 1 to 8 carbon atoms, an alkenyl group having 1 to 8 carbon atoms, or an alkyloxy group having 1 to 8 carbon atoms, and a hydrogen atom on each ring represented by $M^1$ to $M^3$ is preferably unsubstituted, a halogen atom, or substituted with an alkyl group having 1 to 8 carbon atoms and more preferably unsubstituted or substituted with an alkyl group having 1 to 8 carbon atoms.

A halogen atom with which a hydrogen atom on each ring represented by $M^1$ to $M^3$ may be substituted is more preferably a fluorine atom or a chlorine atom.

An alkyl group having 1 to 8 carbon atoms with which a hydrogen atom on each ring represented by $M^1$ to $M^3$ may be substituted is preferably an alkyl group having 1 to 4 carbon atoms and more preferably a methyl group.

In the formula (2), n represents an integer of 1 to 3, is preferably 1 or 2, and more preferably 1.

Hereinafter, specific examples of the liquid crystal compound represented by the formula (2) are described, but the present invention is not limited thereto.

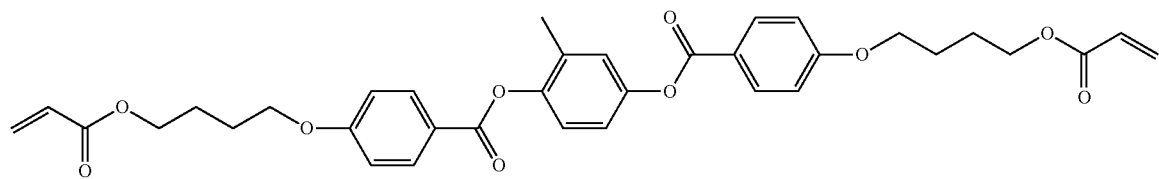
(M-1)
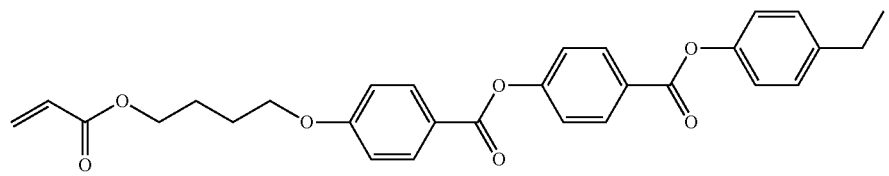
(M-2)
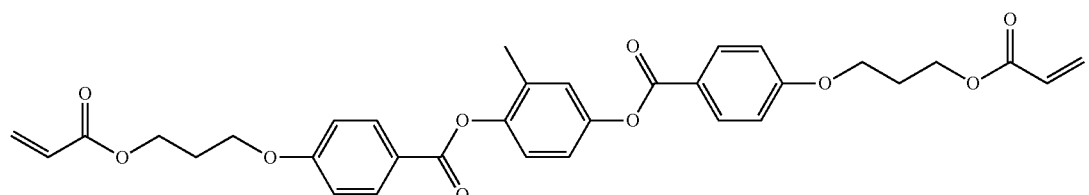
(RM-257)
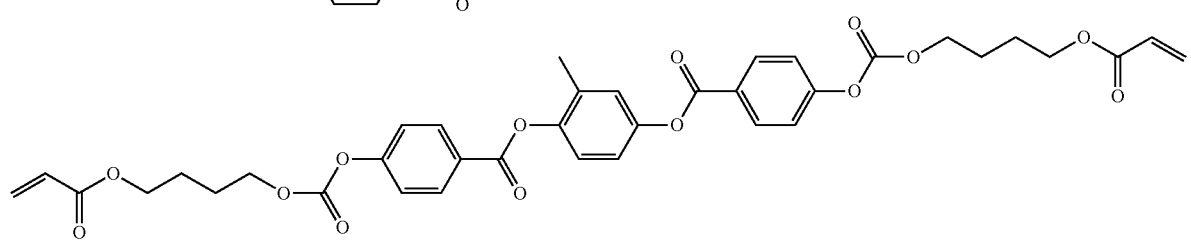
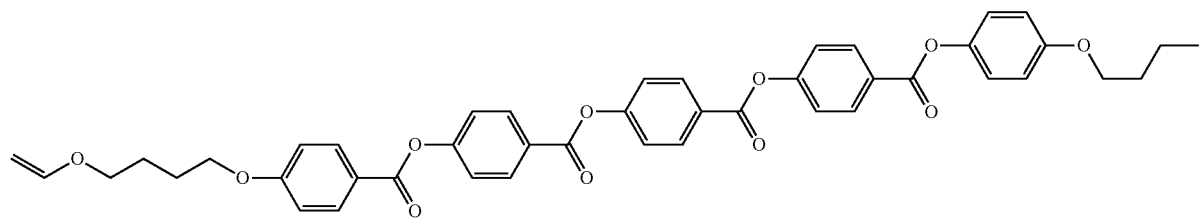
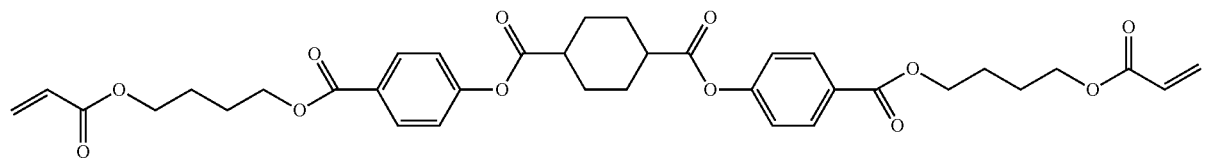
Specific examples of other liquid crystal compounds which can be preferably used in present invention other than the liquid crystal compound represented by the formula (2) are described below, but the present invention is not limited thereto.
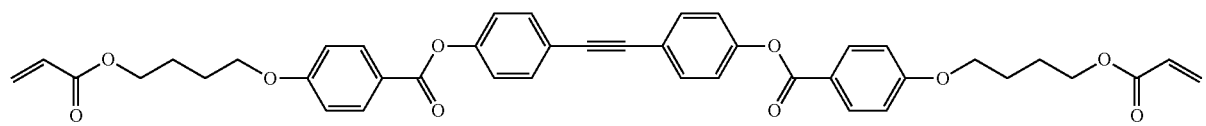

-continued

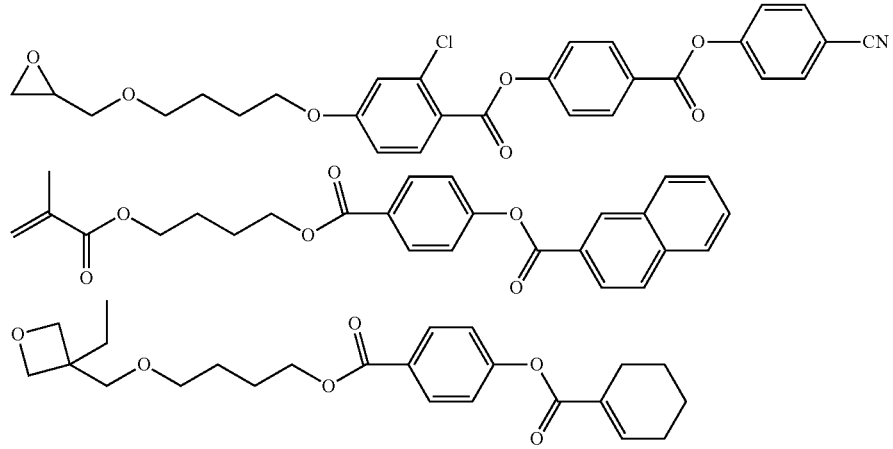

<Other Components>

The liquid crystal composition of the present invention may contain other components as additives. For example, the liquid crystal compound may contain a polymerization initiator when a polymerizable liquid crystal compound is used. In order to improve uniformity of alignment, coating suitability, and film strength, at least one kind selected from various additives such as an alignment control agent (particularly, a horizontal alignment agent), an ununiformity inhibitor, a repelling inhibitor, and a polymerizable monomer. Further, a polymerization inhibitor, an antioxidant, a UV absorber, a light stabilizer, or the like can be added to the liquid crystal composition within the range not degrading optical performance if necessary. The liquid crystal composition of the present invention may contain two kinds or more of each component.

(Polymerization Initiator)

Preferably, the liquid crystal composition of the present invention is a polymerizable liquid crystal composition and contains a polymerization initiator for that. In the present invention, it is preferable that the curing reaction be promoted through irradiation with UV rays, the polymerization initiator to be used is preferably a photopolymerization initiator capable of initiating a polymerization reaction through irradiation with UV rays. Examples of the photopolymerization initiator include α-carbonyl compounds (described in U.S. Pat. Nos. 2,367,661, 2,367,670), acyloin ethers (described in U.S. Pat. No. 2,448,828), α-hydrocarbon-substituted aromatic acyloin compounds (described in U.S. Pat. No. 2,722,512), polynuclear quinone compounds (described in U.S. Pat. No. 3,046,127 and U.S. Pat. No. 2,951,758), a combination of triarylimidazole dimer and p-aminophenylketone (described in U.S. Pat. No. 3,549,367), acridine and phenazine compounds (described in JP-A-60-105667, U.S. Pat. No. 4,239,850), and oxadiazole compounds (described in U.S. Pat. No. 4,212,970).

The amount of the photopolymerization initiator to be used is preferably in the range of 0.1% by mass to 20% by mass of the liquid crystal composition (in a case where the composition is a coating liquid, the solid content thereof), and more preferably in the range of 1% by mass to 8% by mass.

(Alignment Control Agent)

An alignment control agent contributing to stably or rapidly showing a cholesteric liquid crystal phase may be added to the liquid crystal composition. Examples of the alignment control agent include fluorine-containing (meth)acrylate polymers and compounds represented by the following formulae (X1) to (X3). Two or more kinds selected from these may be contained. These compounds can reduce the tilt angle of the molecules of a liquid crystal compound or can align the molecules thereof substantially horizontally in the air interface of the layer. In this description, "horizontal alignment" means that the major axis of the liquid crystal molecule is parallel to the film surface, but does not require that the two are strictly parallel to each other. In this description, the alignment means that the tilt angle of the molecule to the horizontal plane is less than 20 degrees. In a case where a liquid crystal compound is horizontally aligned near the air interface, alignment defect unlikely occurs and therefore the transparency in the visible light region is improved and reflectance in the infrared region is increased. On the other hand, when the molecules of a liquid crystal compound are aligned at a large tilt angle, in a cholesteric liquid crystal phase, the helical axis thereof may deviate from the normal line of the film plane and, as a result, the reflectance may lower and there may be formed finger print patterns to thereby unfavorably cause haze increase and diffraction.

Examples of the fluorine-containing (meth)acrylate polymer usable as the above-described alignment control agent are described in JP-A-2007-272185, paragraphs of [0018] to [0043].

Hereinafter, the compounds represented by the following formulae (X1) to (X3) which can be used as an alignment control agent will be sequentially described.

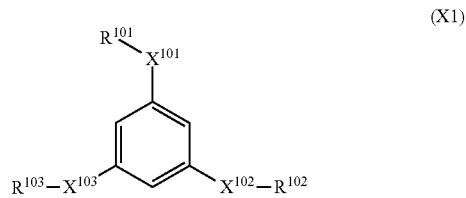

(X1)

In the formula, $R^{101}$, $R^{102}$, and $R^{103}$ each independently represent a hydrogen atom or a substituent and $X^{101}$, $X^{102}$, and $X^{103}$ each independently represent a single bond or a divalent linking group. As substituents represented by each of $R^{101}$ to $R^{103}$, substituted alkyl groups or unsubstituted alkyl groups (among these, an unsubstituted alkyl group or a fluorine-substituted alkyl group is more preferable), aryl groups (among these, an aryl group having a fluorine-substituted alkyl group is preferable), substituted amino groups or unsubstituted amino groups, alkoxy groups, alkylthio groups, and halogen atoms are preferable. As divalent linking groups represented by each of $X^{101}$, $X^{102}$, and $X^{103}$, a divalent linking group selected from a group consisting of an alkylene group, an alkenylene group, a divalent aromatic group, a divalent heterocyclic residue, —CO—, —NRa— (Ra represents an alkyl group having 1 to 5 carbon atoms or a hydrogen atom), —O—, —S—, —SO—, —SO$_2$—, and a combination of these is preferable. The divalent linking group is more preferably a divalent linking group selected from a group consisting of an alkylene group, a phenylene group, —CO—, —NRa—, —O—, —S—, and —SO$_2$— or a divalent linking group obtained by combining at least two groups selected from the group. The number of carbon atoms of the alkylene group is preferably in the range of 1 to 12. The number of carbon atoms of alkenylene group is preferably in the range of 2 to 12. The number of carbon atoms of a divalent aromatic group is preferably in the range of 6 to 10.

(X2)

In the formula, $R^{201}$ represents a substituent and m201 represents an integer of 0 to 5. In a case where m201 represents an integer of 2 or more, a plurality of R's may be the same as or different from each other. Examples of substituents preferable for $R^{201}$ are the same as preferred examples of substituents represented by $R^{101}$, $R^{102}$ and $R^{103}$. m201 preferably represents an integer of 1 to 3 and particularly preferably 2 or 3.

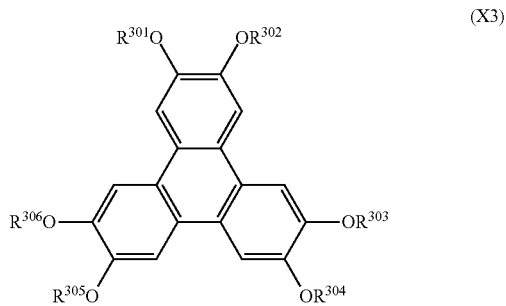

(X3)

in the formula, $R^{301}$, $R^{302}$, $R^{303}$, $R^{304}$, $R^{305}$, and $R^{306}$ each independently represent a hydrogen atom or a substituent. Preferably, examples of substituents represented by each of $R^{301}$, $R^{302}$, $R^{303}$, $R^{304}$, $R^{305}$, and $R^{306}$ are the same as the preferred examples of substituents represented by $R^1$, $R^2$, and $R^3$ in the formula (X1).

Examples of the compounds represented by the formulae (X1) to (X3) which can be used as an alignment control agent in the present invention include the compounds described in JP-A-2005-99248.

Further, in the present invention, one kind among the compounds represented by the formulae (X1) to (X3) may be used alone or two kinds or more may be used in combination as an alignment control agent.

The amount of a compound represented by any of the formulae (X1) to (X3) to be added in the liquid crystal composition is preferably in the range of 0.01% by mass to 10% by mass, more preferably in the range of 0.01% by mass to 5% by mass, and particularly preferably 0.02% by mass to 1% by mass with respect to the mass of the liquid crystal composition.

<Solvent>

As the solvent of the liquid crystal composition of the present invention, which is not particularly limited, known solvents can be used and, among these, an organic solvent is preferably used. Examples of the organic solvent include amides (for example, N,N-dimethylformamide), sulfoxides (for example, dimethylsulfoxide), heterocyclic compounds (for example, pyridine), hydrocarbons (for example, benzene, hexane), alkyl halides (for example, chloroform, dichloromethane), esters (for example, methyl acetate, butyl acetate), ketones (for example, acetone, methyl ethyl ketone, cyclohexanone), ethers (for example, tetrahydrofuran, 1,2-dimethoxyethane). Preferred are alkyl halides and ketones. Two or more different types of organic solvents may be used here as combined.

[Film]

A film of the present invention can be obtained by curing the liquid crystal composition of the present invention.

Further, the film of the present invention can be obtained by fixing the cholesteric liquid crystal phase formed of the liquid crystal composition of the present invention.

The film can be formed by producing a film using a method of coating with the liquid crystal composition of the present invention. A film exhibiting optical anisotropy can be prepared by coating an alignment film with the liquid crystal composition and forming a liquid crystal composition layer. It is preferable that the film of the present invention exhibit optical anisotropy.

Preferably, the film of the present invention is prepared by a coating method. An example of a production method includes at least:

(1) coating a surface of a substrate or the like with a curable liquid crystal composition to enter a cholesteric liquid crystal phase state, and (2) promoting a curing reaction by irradiating the curable liquid crystal composition with UV rays and forming a layer to which the cholesteric liquid crystal phase is fixed.

In the above process (1), first, the curable liquid crystal composition is applied onto the surface of a substrate or onto the surface of an underlying coating layer. The curable liquid crystal composition is preferably prepared as a coating liquid by dissolving and/or dispersing materials in a solvent. Coating with the coating liquid may be attained in various methods such as a wire bar coating method, an extrusion coating method, a direct gravure coating method, a reverse gravure coating method, a die coating method, etc. Also employable here is an inkjet apparatus where the liquid crystal composition is jetted out through the nozzle to form a coating film.

The substrate has a self-supporting property and materials and optical characteristics thereof are not limited as long as the substrate supports the liquid crystal composition. According to the use, high transparency with respect to UV light may be required. Examples of the substrate include a glass substrate with an alignment film; a special phase difference substrate such as a λ/2 plate or the like to be produced by managing a production process so as to satisfy predetermined optical characteristics; and a polymer film in which unevenness of an in-plane retardation is large and, specifically, the unevenness of Re (1000) 20 nm or more or 100 nm or more when the unevenness is expressed using in-plane retardation Re (1000) at a wavelength of 1000 nm, and which cannot be used as a predetermined phase difference plate. The in-plane retardation of the substrate is not particularly limited and a phase difference plate or the like having an in-plane retardation Re (1000) at a wavelength of 1000 nm of 800 nm to 13000 nm can be used.

As a polymer film with high transparency with respect to visible light, a polymer film for various optical films used as a member of a display substrate such as a liquid crystal display device or the like can be exemplified. Examples of the substrate include a polyester film such as polyethylene terephthalate (PET), polybuthylene terephthalate, or polyethylene naphthalate (PEN); a polycarbonate (PC) film; a polymethylmethacrylate film; a polyolefin film such as polyethylene or polypropylene; a polyimide film; and a triacetyl cellulose (TAC) film.

The alignment film can be prepared by a rubbing treatment of an organic compound (preferably, a polymer), oblique evaporation of an inorganic compound; formation of a layer having microgrooves; or accumulating organic compounds (for example, ω-tricosanoic acid, dioctadecylmethylammonium chloride, and methyl stearate) using a Langmuir-Blodgett method (LB film). Further, an alignment film in which an alignment function is generated through application of an electric field, a magnetic field, or light is known. An alignment film which is formed by a rubbing treatment of a polymer is particularly preferable. The rubbing treatment is performed by rubbing the surface of a polymer layer using paper or cloth several times in a predetermined direction. The kind of the polymer used for the alignment film is determined according to alignment (particularly, an average inclination angle) of liquid crystal molecules. A polymer (normal polymer for an alignment film) in which surface energy of an alignment film is not decreased is used to align liquid crystal molecules in the horizontal direction (average inclination angle: 0° to 50°). A polymer in which surface energy of an alignment film is not decreased is used to align liquid crystal molecules in the vertical direction (average inclination angle: 50° to 90°). In order to decrease the surface energy of an alignment film, it is preferable that a hydrocarbon group having 10 to 100 carbon atoms be introduced to the side chain of a polymer.

The kind of polymer is specifically described in a literature related to an optical compensation sheet using liquid crystal molecules corresponding to various display modes. The thickness of the alignment film is preferably in the range of 0.01 μm to 5 μm and more preferably in the range of 0.05 μm to 1 μm. Further, a liquid crystal composition film may be transferred onto a transparent support after liquid crystal molecules of the liquid crystal composition layer are aligned using an alignment film. The liquid crystal molecules fixed in an alignment state can maintain the alignment state even when an alignment film is not present. Further, in a case of alignment with an average inclination angle of less than 5°, it is not necessary to perform the rubbing treatment and the alignment film is not required. In this case, for the purpose of improving an adhesion property between liquid crystal molecules and a transparent support, an alignment film (described in JP-A-9-152509) forming a chemical bond with liquid crystal molecules on the interface may be used. When the alignment film is used for the purpose of improving the adhesion property, the rubbing treatment may not be necessary. In a case where two kinds of liquid crystal composition layers are provided on the same side of a transparent support, it is possible to make the liquid crystal composition layer formed on the transparent support function as an alignment film of the liquid crystal composition layer provided thereon.

The thickness of the liquid crystal composition layer is preferably in the range of 0.1 μm to 50 μm, more preferably in the range of 1 μm to 30 μm, and most preferably in the range of 2 μm to 20 μm.

Next, a curable liquid crystal composition which is applied to the surface to be a coating film is processed to be a cholesteric liquid crystal phase. In the embodiment where the curable liquid crystal composition is prepared as a coating liquid that contains a solvent, the coating film is dried and the solvent is removed, whereby the coating film may be converted into a state having a cholesteric liquid crystal phase. For making the coating film to have a transition temperature at which the coating film is converted into a cholesteric liquid crystal phase, the coating film may be optionally heated. For example, once the coating film is heated up to a temperature of the isotropic phase thereof, and then it is cooled down to a cholesteric liquid crystal phase transition temperature, whereby the coating film can be stably converted into a state of cholesteric liquid crystal phase. The liquid crystal phase transition temperature of the curable liquid crystal composition of the present invention is preferably in a range of 10° C. to 250° C. from the viewpoint of the production aptitude, more preferably in a range of 10° C. to 150° C. When the temperature is lower than 10° C., the production process requires a cooling process for lowering the temperature of the coating film to a temperature range in which the film can exhibit a liquid crystal phase. On the other hand, when the temperature is higher than 200° C., the process requires a high temperature in order that the coating film can be in an isotropic liquid state at a further higher temperature than the temperature range in which the film can once exhibit a liquid crystal phase, and such is unfavorable from the viewpoint of heat energy wasting, substrate deformation, degradation, and the like.

Next, in the process (2), the coating film that enters a state of a cholesteric liquid crystal phase is irradiated with UV rays and promotes curing reaction. For UV irradiation, usable is a light source of a UV lamp or the like. In this process, the coating film is irradiated with UV rays whereby curing reaction of the liquid crystal composition is promoted and the cholesteric liquid crystal phase is thereby fixed to form a layer (light reflection layer).

The energy dose in irradiation with UV rays is not specifically defined. In general, preferred is a dose of from 100 mJ/cm$^2$ to 800 mJ/cm$^2$. The time for which the coating film is irradiated with UV rays is not also specifically defined. The time may be determined from the viewpoint of both the sufficient strength of the cured film and the productivity thereof.

For accelerating the curing reaction, the UV irradiation may be carried out under heat. Preferably, the temperature in irradiation with UV rays is kept in a temperature range in which the cholesteric liquid crystal phase is exhibited so as not to disturb the cholesteric liquid crystal phase of the film. The oxygen concentration in the atmosphere participates in the degree of polymerization, and therefore, in a case where the desired degree of polymerization is not secured in air and where the film strength is therefore insufficient, it is desirable that the oxygen concentration in the atmosphere is reduced by a nitrogen-purging method or the like. The oxygen concentration is preferably 10% or less, more preferably 7% or less, and most preferably 3% or less. The reaction yield of the curing reaction (for example, polymerization reaction), which is promoted through irradiation with UV rays, is preferably 70% or more, more preferably 80% or more, and still more preferably 90% or more from the viewpoint of holding the mechanical strength of the layers, suppressing the outflow of unreacted substances from the layers and the like. In order to improve the reaction yield, a method for increasing the radiation dose of UV rays to be radiated or polymerization in a nitrogen atmosphere or under heating conditions is effective. In addition, it is also possible to use a method in which the composition is temporarily polymerized, and then held in a higher temperature state than the polymerization temperature, thereby further progressing the reaction through thermal polymerization or a method in which UV rays are radiated again. The reaction yield can be measured by comparing the absorption intensities in the infrared vibration spectra of the reactive group (for example, polymerizable group) before and after the reaction.

In the above process, the cholesteric liquid crystal phase is fixed to form a film of the present invention.

The film of the present invention is preferably a layer formed by fixing the cholesteric liquid crystal phase of the liquid crystal composition of the present invention, and, in this case, it is more preferable that the film exhibit selective reflection characteristics and particularly preferable that the film exhibit selective reflection characteristics in an infrared wavelength region. The light reflection layer formed by fixing the cholesteric liquid crystal phase is described in detail in methods of JP-A-2011-107178 and JP-A-2011-018037 and can be preferably used in the present invention.

Here, regarding the "fixed" state of the liquid crystal phase, a state where the alignment of the liquid crystal compound that exhibits the cholesteric liquid crystal phase is maintained as such is a most typical and preferred embodiment. However, not limited thereto but concretely, the fixed state means that the layer has no more fluidity in a temperature range of generally from 0° C. to 50° C., but from −30° C. to 70° C. in a more severe condition, and can continue to stably keep the fixed alignment state thereof without providing any change in the alignment state by any external field or external force. In the present invention, the alignment state of the cholesteric liquid crystal phase is fixed by the curing reaction that is promoted through irradiation with UV rays.

Further, in the present invention, it is enough that the optical properties of the cholesteric liquid crystal phase are maintained in the layer, and finally the liquid crystal composition in the film of the present invention does not need to exhibit the liquid crystallinity. For example, the liquid crystal composition is polymerized through the curing reaction to thereby have no more liquid crystallinity.

(Laminate)

Preferably, the film of the present invention may become a laminate formed by laminating a plurality of layers formed by fixing the cholesteric liquid crystal phase of the liquid crystal composition of the present invention. For example, a film with high light reflectivity can be obtained by laminating a layer containing an optically active compound of right torsion and capable of reflecting right circular polarization light and a layer containing an optically active compound of left torsion and capable of reflecting left circular polarization light.

(Use of Film)

The film of the present invention can be made into a film exhibiting selective reflection characteristics with a reflection peak at a wavelength of 700 nm or more (more preferably in the range of 800 nm to 1300 nm). In the film having such characteristics is adhered to buildings such as a house and an office building or a window of a vehicle such as an automobile as a member for shielding heat of solar radiation. Alternatively, an infrared light reflective plate of the present invention can be provided for the purpose of using as a member (for example, glass for shielding heat, a film for shielding heat, or the like) for shielding heat of solar radiation. In addition, a film exhibiting selective reflection characteristics with a reflection peak at a wavelength of 700 nm or less can be prepared. In this case, the film can be provided for the purpose of using as a color filter or the like for a liquid crystal display.

[Polymer and Cholesteric Liquid Crystal]

The liquid crystal composition of the present invention may be used for other purposes in addition to the above-described film.

The present invention relates to a polymer obtained by polymerizing the liquid crystal composition of the present invention.

Further, the present invention relates to a cholesteric liquid crystal formed of the liquid crystal composition of the present invention.

The polymer of the present invention and the cholesteric liquid crystal of the present invention can be used as described in JP-T-2009-533360.

EXAMPLES

The present invention will be described in detail with reference to Examples and Comparative Examples. The materials, the used amount, the ratio, the contents of a treatment, and the procedures of a treatment described in Examples below can be appropriately changed within the range not departing the scope of the present invention. Accordingly, the range of the present invention is not limited by the specific examples described below.

Structures of exemplary compounds (1) to (3) used in respective Examples and structures of comparative compounds (1) and (2) used in respective Comparative Examples are shown below.

Exemplary compound (1)

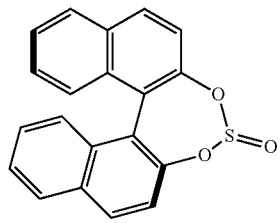

Exemplary compound (2)

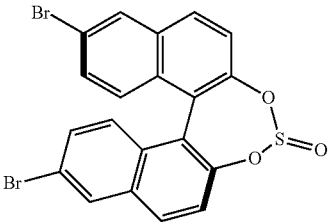

Exemplary compound (3)

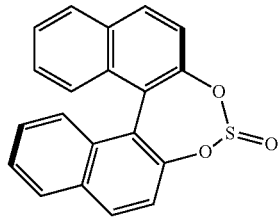

Comparative compound (1)

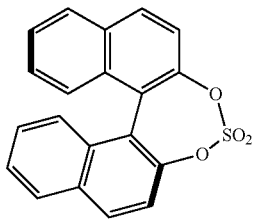

Comparative compound (2)

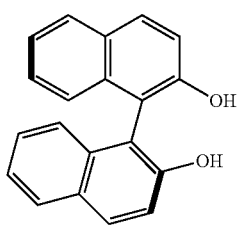

Synthesis Examples 1 and 2

Synthesis of Exemplary Compounds (1) and (2)

The exemplary compounds (1) and (2) were synthesized using a method described in Non-Patent Document "Heteroatom Chemistry," 2011 vol. 22, pp. 562.

Synthesis Example 3

Synthesis of Exemplary Compound (3)

(S)-1,1'-bi-2-naphthol (10 g, 35 mmol) and triethylamine (14.6 mL, 104 mmol) were dissolved in 100 mL of THF and stirred for 5 minutes under ice cooling. Thionyl chloride (2.5 mL, 35 mmol) was added dropwise to the solution and stirred at room temperature for 1 hour and under ice cooling for 30 minutes. Generated salts are filtered, concentrated, and purified using silica gel column chromatography.

$^1$H-NMR (CDCl$_3$, 300 MHz): 7.3-7.4 (m, 2H), 7.5-7.6 (m, 6H), 7.9-8.1 (m, 4H)

Example 1

Preparation of Liquid Crystal Composition and HTP Measurement of Optically Active Compound Using Wedge Cell A mixture of 1 part by mass of the exemplary compound (1) and 99 parts by mass of a nematic liquid crystal composition (Demus-5, manufactured by Merck & Co., Inc.) was set as the liquid crystal composition of Example 1 and a wedge cell (glass thickness of 1.1 mm, blue plate) to which an uniaxial treatment was applied with a polyimide alignment film was injected. When the liquid crystal composition of Example 1 was confirmed to show a cholesteric liquid crystal phase using a polarizing microscope, the helical pitch of the liquid crystal composition of Example 1 was measured at room temperature, and the helical twisting power (HTP) of the exemplary compound (1) was acquired, the value was 54.0 µm$^{-1}$. Further, the helix was directed to the left.

Example 2

Preparation of Liquid Crystal Composition and HTP Measurement of Optically Active Compound Using Wedge Cell A mixture of 1 part by mass of the exemplary compound (2) and 99 parts by mass of a nematic liquid crystal composition (Demus-5, manufactured by Merck & Co., Inc.) was set as the liquid crystal composition of Example 2 and a wedge cell (glass thickness of 1.1 mm, blue plate) to which an uniaxial treatment was applied with a polyimide alignment film was injected. When the liquid crystal composition of Example 2 was confirmed to show a cholesteric liquid crystal phase using a polarizing microscope, the helical pitch of the liquid crystal composition of Example 2 was measured at room temperature, and the helical twisting power (HTP) of the exemplary compound (2) was acquired, the value was 46.1 µm$^{-1}$. Further, the helix was directed to the left.

Example 3

Preparation of Liquid Crystal Composition and HTP Measurement of Optically Active Compound Using Wedge Cell A mixture of 1 part by mass of the exemplary compound (3) and 99 parts by mass of a nematic liquid crystal composition (Demus-5, manufactured by Merck & Co., Inc.) was set as the liquid crystal composition of Example 3 and a wedge cell (glass thickness of 1.1 mm, blue plate) to which an uniaxial treatment was applied with a polyimide alignment film was injected. When the liquid crystal composition of Example 3 was confirmed to show a cholesteric liquid crystal phase using a polarizing microscope, the helical pitch of the liquid crystal composition of Example 3 was measured at room temperature, and the helical twisting power (HTP) of the exemplary compound (3) was acquired, the value was 54.0 µm$^{-1}$. Further, the helix was directed to the right.

Comparative Example 1

Preparation of Liquid Crystal Composition and HTP Measurement of Optically Active Compound Using Wedge Cell A mixture of 1 part by mass of the comparative compound (1) and 99 parts by mass of a nematic liquid crystal composition (Demus-5, manufactured by Merck & Co., Inc.) was set as the liquid crystal composition of Comparative Example 1 which was synthesized using a method similar to that described in US 2010/0019199 A1 and a wedge cell (glass thickness of 1.1 mm, blue plate) to which an uniaxial treatment was applied with a polyimide alignment film was injected. When the liquid crystal composition of Comparative Example 1 was confirmed to show a cholesteric liquid crystal phase using a polarizing microscope, the helical pitch of the liquid crystal composition of Comparative Example 1 was measured at room temperature, and the helical twisting power (HTP) of the comparative compound (1) was acquired, the value was 35.4 µm$^{-1}$. Further, the helix was directed to the left.

Comparative Example 2

Preparation of Liquid Crystal Composition and HTP Measurement of Optically Active Compound Using Wedge Cell A mixture of 1 part by mass of the comparative compound (2) ((R)-1,1'-bi-2-naphthol) and 99 parts by mass of a nematic liquid crystal composition (Demus-5, manufactured by Merck & Co., Inc.) was set as the liquid crystal composition of Comparative Example 2 and a wedge cell (glass thickness of 1.1 mm, blue plate) to which an uniaxial treatment was applied with a polyimide alignment film was injected. When the liquid crystal composition of Comparative Example 2 was confirmed to show a cholesteric liquid crystal phase using a polarizing microscope, the helical pitch of the liquid crystal composition of Comparative Example 2 was measured at room temperature, and the helical twisting power (HTP) of the comparative compound (2) was acquired, the value was 9.3 Further, the helix was directed to the left.

Obtained results are listed in Table below.

TABLE 1

|  | Optically active compound | HTP/ $\mu m^{-1}$ | Direction of helix of cholesteric liquid crystal phase of liquid crystal composition |
|---|---|---|---|
| Example 1 | Exemplary compound (1) | 54.0 | Left |
| Example 2 | Exemplary compound (2) | 46.1 | Left |
| Example 3 | Exemplary compound (3) | 54.0 | Right |
| Comparative Example 1 | Comparative compound (1) | 35.4 | Left |
| Comparative Example 2 | Comparative compound (2) | 9.3 | Left |

From Table 1, it is understood that the liquid crystal composition of the present invention using an optically active compound having a binaphthol skeleton represented by the formula (1) shows the cholesteric liquid crystal phase.

Further, it is understood that the optically active compound represented by the formula (1) has higher HTP compared to those of the comparative compounds. Furthermore, it is understood that the exemplary compound (1) of Example 1 among, the exemplary compounds (1) to (3) shows higher HTP.

Example 4

Formation of Film Showing Selective Reflection Characteristics

A liquid crystal composition coating liquid of Example 4 having the following composition was prepared using the exemplary compound (1) and a polymerizable liquid crystal compound (M-1).

Exemplary Compound (1): 4 Parts by Mass
Polymerizable liquid crystal compound (M-1): 100 parts by mass
Air interface alignment agent (1): 0.04 parts by mass
Polymerization initiator IRGACURE 819 (manufactured by BASF Corporation): 3 parts by mass
Solvent chloroform: 800 parts by mass

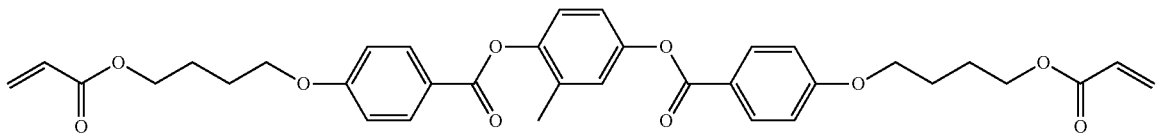

Polymerizable liquid crystal compound (M-1)

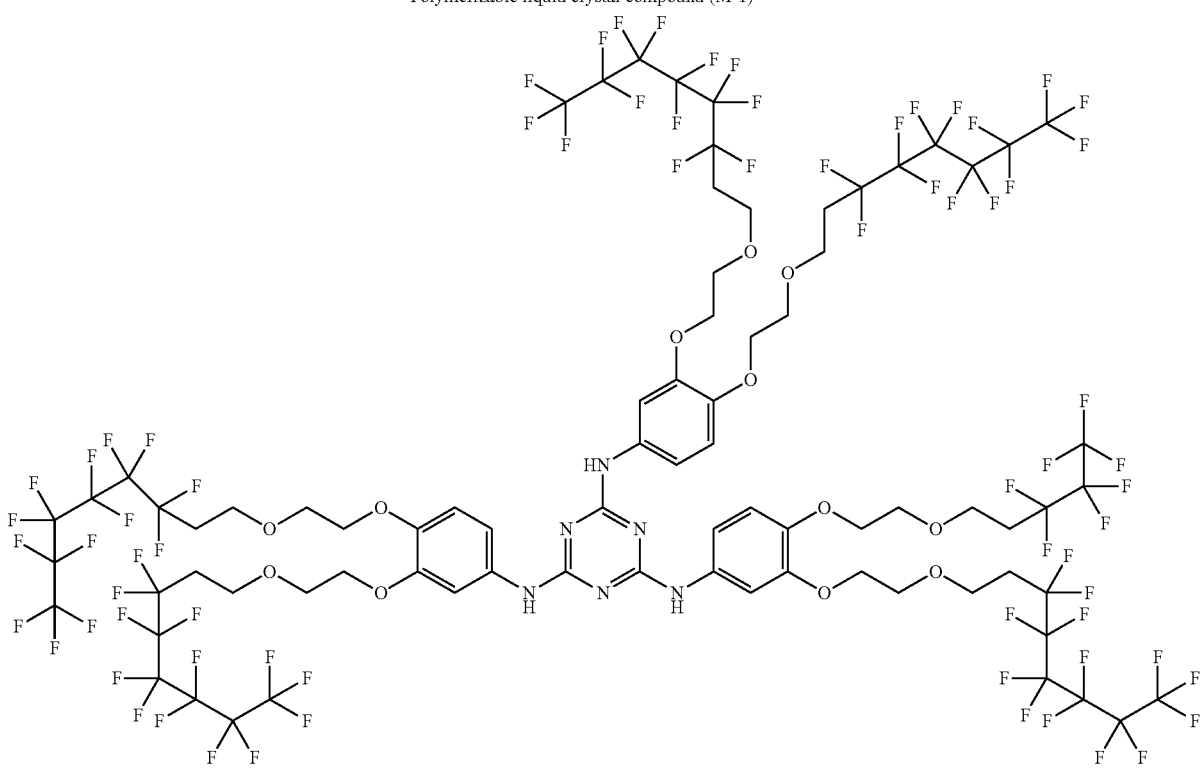

Air interface alignment agent (1)

Next, the surface of a washed glass substrate was coated with a polyimide alignment film SE-130 (manufactured by Nissan Chemical Industries, Ltd.) using a spin coating method, dried, and fired at 250° C. for 1 hour. The fired substrate was subjected to a rubbing treatment, thereby preparing a substrate with an alignment film. The surface of the alignment film to which the rubbing treatment was applied was coated with the liquid crystal composition coating liquid of Example 4 using a spin coating method at room temperature, was aligned and aged at 90° C. for 60 seconds, and was irradiated with light at 60° C. for 10 seconds using a high-pressure mercury lamp in which single wavelength components of UV light were blocked in a nitrogen gas atmosphere, and the alignment thereof was fixed, thereby obtaining a film (selective reflection film) of Example 4 showing selective reflection characteristics. When the obtained selective reflection film was observed using a polarizing microscope, it was confirmed that alignment defects did not occur and the alignment thereof was uniform. Further, when the transmission spectrum of the selective reflection film was measured using a spectrophotometer UV-3100PC (manufactured by Shimadzu Corporation), a selective reflection peak was present in an infrared region having the center thereof at 820 nm. Further, the HTP was 46 $\mu m^{-1}$ when the average refractive index of a liquid crystal was 1.5.

Example 5

Formation of Film Showing Selective Reflection Characteristics

A liquid crystal composition coating liquid of Example 5 having the following composition was prepared using the exemplary compound (1) and a polymerizable liquid crystal compound (RM-257).

Exemplary Compound (1): 4 Parts by Mass
Polymerizable liquid crystal compound (RM-257, Manufactured by Merck & Co., Inc.): 100 Parts by Mass
Air interface alignment agent (1): 0.04 parts by mass
Polymerization initiator IRGACURE 819 (manufactured by BASF Corporation): 3 parts by mass
Solvent chloroform: 800 parts by mass The surface of the substrate with an alignment film used in Example 4 to which the rubbing treatment was applied was coated with the liquid crystal composition coating liquid of Example 5 using a spin coating method at room temperature, was aligned and aged at 90° C. for 60 seconds, and was irradiated with light at 60° C. for 10 seconds using a high-pressure mercury lamp in which single wavelength components of UV light were blocked in a nitrogen gas atmosphere, and the alignment thereof was fixed, thereby obtaining a film (selective reflection film) of Example 5 showing selective reflection characteristics. When the obtained selective reflection film was observed using a polarizing microscope, it was confirmed that alignment defects did not occur and the alignment thereof was uniform. Further, when the transmission spectrum of the selective reflection film was measured using a spectrophotometer UV-3100PC (manufactured by Shimadzu Corporation), a selective reflection peak was present in an infrared region having the center thereof at 860 nm. Further, the HTP was 44 $\mu m^{-1}$ when the average refractive index of a liquid crystal was 1.5.

Example 6

Formation of Film Showing Selective Reflection Characteristics

A liquid crystal composition coating liquid of Example 6 having the following composition was prepared using the exemplary compound (1) and polymerizable compounds M-1 and M-2.

Exemplary Compound (1): 4 Parts by Mass
Polymerizable liquid crystal compound (M-1): 80 parts by mass
Polymerizable liquid crystal compound (M-2): 20 parts by mass
Air interface alignment agent (1): 0.04 parts by mass
Polymerization initiator IRGACURE 819 (manufactured by BASF Corporation): 3 parts by mass
Solvent chloroform: 800 parts by mass

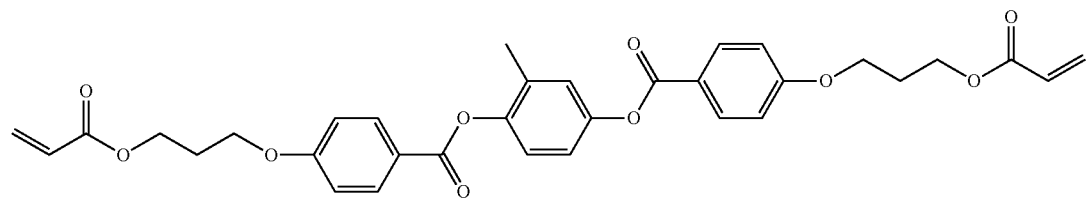

Polymerizable liquid crystal compound (RM-257)

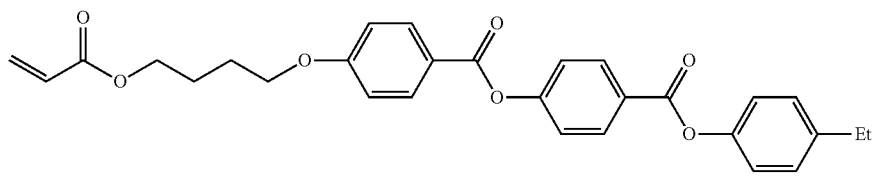

Polymerizable liquid crystal compound (M-2)

The surface of the substrate with an alignment film used in Example 4 to which the rubbing treatment was applied was coated with the liquid crystal composition coating liquid of Example 6 using a spin coating method at room temperature, was aligned and aged at 90° C. for 60 seconds, and was irradiated with light at 60° C. for 10 seconds using a high-pressure mercury lamp in which single wavelength components of UV light were blocked in a nitrogen gas atmosphere, and the alignment thereof was fixed, thereby obtaining a film (selective reflection film) of Example 6 showing selective reflection characteristics. When the obtained selective reflection film was observed using a polarizing microscope, it was confirmed that alignment defects did not occur and the alignment thereof was uniform. Further, when the transmission spectrum of the selective reflection film was measured using a spectrophotometer UV-3100PC (manufactured by Shimadzu Corporation), a selective reflection peak was present in an infrared region having the center thereof at 850 nm. Further, the HTP was 45 $\mu m^{-1}$ when the average refractive index of a liquid crystal was 1.5.

Example 7

Formation of Film Showing Selective Reflection Characteristics

A liquid crystal composition coating liquid of Example 7 having the following composition was prepared using the exemplary compound (2) and a polymerizable compound (M-1).
Exemplary Compound (2): 4 Parts by Mass
Polymerizable liquid crystal compound (M-1): 100 parts by mass
Air interface alignment agent (1): 0.04 parts by mass
Polymerization initiator IRGACURE 819 (manufactured by BASF Corporation): 3 parts by mass
Solvent chloroform: 800 parts by mass
The surface of the substrate with an alignment film used in Example 4 to which the rubbing treatment was applied was coated with the liquid crystal composition coating liquid of Example 7 using a spin coating method at room temperature, was aligned and aged at 90° C. for 60 seconds, and was irradiated with light at 60° C. for 10 seconds using a high-pressure mercury lamp in which single wavelength components of UV light were blocked in a nitrogen gas atmosphere, and the alignment thereof was fixed, thereby obtaining a film (selective reflection film) of Example 7 showing selective reflection characteristics. When the obtained selective reflection film was observed using a polarizing microscope, it was confirmed that alignment defects did not occur and the alignment thereof was uniform. Further, when the transmission spectrum of the selective reflection film was measured using a spectrophotometer UV-3100PC (manufactured by Shimadzu Corporation), a selective reflection peak was present in an infrared region having the center thereof at 940 nm. Further, the HTP was 40 $\mu m^{-1}$ when the average refractive index of a liquid crystal was 1.5.

Example 8

Formation of Film Showing Selective Reflection Characteristics

A liquid crystal composition coating liquid of Example 8 having the following composition was prepared using the exemplary compound (3) and a polymerizable compounds (M-1).
Exemplary Compound (3): 4 Parts by Mass
Polymerizable liquid crystal compound (M-1): 100 parts by mass
Air interface alignment agent (1): 0.04 parts by mass
Polymerization initiator IRGACURE 819 (manufactured by BASF Corporation): 3 parts by mass
Solvent chloroform: 800 parts by mass
The surface of the substrate with an alignment film used in Example 4 to which the rubbing treatment was applied was coated with the liquid crystal composition coating liquid of Example 8 using a spin coating method at room temperature, was aligned and aged at 90° C. for 60 seconds, and was irradiated with light at 60° C. for 10 seconds using a high-pressure mercury lamp in which single wavelength components of UV light were blocked in a nitrogen gas atmosphere, and the alignment thereof was fixed, thereby obtaining a film (selective reflection film) of Example 8 showing selective reflection characteristics. When the obtained selective reflection film was observed using a polarizing microscope, it was confirmed that alignment defects did not occur and the alignment thereof was uniform. Further, when the transmission spectrum of the selective reflection film was measured using a spectrophotometer UV-3100PC (manufactured by Shimadzu Corporation), a selective reflection peak was present in an infrared region having the center thereof at 820 nm. Further, the HTP was 46 $\mu m^{-1}$ when the average refractive index of a liquid crystal was 1.5.

Comparative Example 3

Formation of Film

A liquid crystal composition coating liquid of Comparative Example 3 having the following composition was prepared using the comparative compound (2) ((R)-1,1'-bi-2-naphthol) and a polymerizable compound (M-1).
Comparative Compound (2): 4 Parts by Mass
Polymerizable liquid crystal compound (M-1): 100 parts by mass
Air interface alignment agent (1): 0.04 parts by mass
Polymerization initiator IRGACURE 819 (manufactured by BASF Corporation): 3 parts by mass
Solvent chloroform: 800 parts by mass The surface of the substrate with an alignment film used in Example 4 to which the rubbing treatment was applied was coated with the liquid crystal composition coating liquid of Comparative Example 3 using a spin coating method at room temperature, was aligned and aged at 90° C. for 60 seconds, and was irradiated with light at 60° C. for 10 seconds using a high-pressure mercury lamp in which single wavelength components of UV light were blocked in a nitrogen gas atmosphere, and the alignment thereof was fixed, thereby obtaining a film of Comparative Example 3. When the obtained film of Comparative Example 3 was observed using a polarizing microscope, it was confirmed that alignment defects did not occurred and the haze thereof was 10% or more. In addition, the haze was measured using a haze meter NDH 2000 (manufactured by NIPPON DENSHOKU INDUSTRIES Co., LTD.). Further, when the transmission spectrum of the selective reflection film was measured using a spectrophotometer UV-3100PC (manufactured by Shimadzu Corporation), a selective reflection peak was present in an infrared region having the center thereof at 800 nm. Further, the HTP was 21 $\mu m^{-1}$ when the average refractive index of a liquid crystal was 1.5.

Results obtained in Examples 4 to 8 and Comparative Examples 3 and 4 are listed in Table 2.

TABLE 2

|  | Optically active compound | Polymerizable liquid crystal compound | Alignment defects | Selective reflection wavelength/nm | HTP/$\mu m^{-1}$ |
|---|---|---|---|---|---|
| Example 4 | Exemplary compound (1) | (M-1) | Absent | 820 | 46 |
| Example 5 | Exemplary compound (1) | (RM-257) | Absent | 860 | 44 |
| Example 6 | Exemplary compound (1) | (M-1) and (M-2) | Absent | 850 | 45 |
| Example 7 | Exemplary compound (2) | (M-1) | Absent | 940 | 40 |
| Example 8 | Exemplary compound (3) | (M-1) | Absent | 820 | 46 |
| Comparative Example 3 | Comparative compound (2) | (M-1) | Absent | — | Impossible to calculate |
| Comparative Example 4 | Comparative compound (1) | (M-1) | Present | 800 | 21 | occur and the alignment thereof was uniform. Further, when the transmission spectrum of the film of Comparative Example 3 was measured using a spectrophotometer UV-3100PC (manufactured by Shimadzu Corporation), a selective reflection peak did not appear in a region at 1000 nm or less.

Comparative Example 4

Formation of Film Showing Selective Reflection Characteristics

A liquid crystal composition coating liquid of Comparative Example 4 having the following composition was prepared using 9 parts by mass of the comparative compound (1) and a polymerizable compound (M-1).

Comparative Compound (1): 9 Parts by Mass
Polymerizable liquid crystal compound (M-1): 100 parts by mass
Air interface alignment agent (1): 0.04 parts by mass
Polymerization initiator IRGACURE 819 (manufactured by BASF Corporation): 3 parts by mass
Solvent chloroform: 800 parts by mass The surface of the substrate with an alignment film used in Example 4 to which the rubbing treatment was applied was coated with the liquid crystal composition coating liquid of Comparative Example 4 using a spin coating method at room temperature, was aligned and aged at 90° C. for 60 seconds, and was irradiated with light at 60° C. for 10 seconds using a high-pressure mercury lamp in which single wavelength components of UV light were blocked in a nitrogen gas atmosphere, and the alignment thereof was fixed, thereby obtaining a film (selective reflection film) of Comparative Example 4 showing selective reflection characteristics. When the obtained selective reflection film was observed using a polarizing microscope, it was confirmed that alignment defects From Table 2 above, it is understood that the film of the present invention produced by fixing the cholesteric liquid crystal phase of the liquid crystal composition of the present invention using an optically active compound having the binaphthol skeleton represented by the formula (1) has an excellent alignment state and has a selective reflection peak.

Meanwhile, in the film of Comparative Example 3, the cholesteric liquid crystal phase could be fixed, but the wavelength of selective reflection was unclear. The reason why the selective reflection wavelength of the film of Comparative Example 3 was unclear was that the helical pitch was at a long wavelength out of the measurement range of a transmittance measurement device and the reason why the HTP could not be calculated was that the selective reflection wavelength could not be specified.

It was understood that alignment defects occurred in the film of Comparative Example 4 as a result of adding a large amount of the comparative compound (1) for the purpose of obtaining a target selective reflection wavelength.

While the present invention has been described in detail and with reference to specific embodiments thereof, it will be apparent to one skilled in the art that various changes and modifications can be made therein without departing from the spirit and scope thereof.

The present disclosure relates to the subject matter contained in International Application No. PCT/JP2013/070848, filed Aug. 1, 2013, and Japanese Application No. 2012-174633, filed Aug. 7, 2012, the contents of which are expressly incorporated herein by reference in their entirety. All the publications referred to in the present specification are also expressly incorporated herein by reference in their entirety.

The foregoing description of preferred embodiments of the invention has been presented for purposes of illustration and description, and is not intended to be exhaustive or to limit the invention to the precise form disclosed. The description was selected to best explain the principles of the invention and their practical application to enable others skilled in the art to best utilize the invention in various embodiments and various modifications as are suited to the particular use contemplated. It is intended that the scope of the invention not be limited by the specification, but be defined claims set forth below.

What is claimed is:

1. A liquid crystal composition containing:
an optically active compound represented by the following formula (1); and
a liquid crystal compound:

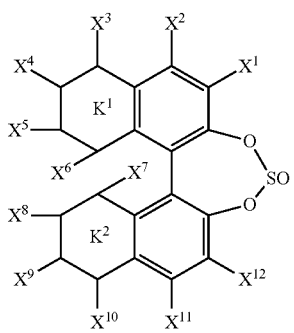

Formula (1)

wherein $K^1$ and $K^2$ each independently represent a benzene ring, a cyclohexane ring, or a cyclohexene ring, and one or more carbon atoms among carbon atoms constituting each ring may be substituted with a nitrogen atom; $X^1$ to $X^{12}$ each independently represent a hydrogen atom, a halogen atom, an alkyl group having 1 to 12 carbon atoms, an alkynyl group having 2 to 12 carbon atoms, an alkenyl group having 2 to 12 carbon atoms, or an alkyloxy group having 1 to 12 carbon atoms, and each $CH_2$ group in the alkyl group, the alkynyl group, the alkenyl group and the alkyloxy group may be independently substituted with O, S, OCO, COO, OCOO, CO, or a phenylene group.

2. The liquid crystal composition according to claim 1, wherein both of $K^1$ and $K^2$ represent benzene rings in the formula (1).

3. The liquid crystal composition according to claim 1, wherein $X^2$, $X^3$, $X^5$ to $X^8$, $X^{10}$, and $X^{11}$ each independently represent a hydrogen atom or a fluorine atom; $X^1$, $X^4$, $X^9$, and $X^{12}$ each independently represent a hydrogen atom, a fluorine atom, a bromine atom, or an alkyl group having 1 to 12 carbon atoms, an alkynyl group having 2 to 12 carbon atoms, an alkenyl group having 2 to 12 carbon atoms, or an alkyloxy group having 1 to 12 carbon atoms, and each $CH_2$ group in the alkyl group, the alkynyl group, the alkenyl group and the alkyloxy group may be independently substituted with O, S, OCO, COO, OCOO, CO, or a phenylene group.

4. The liquid crystal composition according to claim 1, wherein $X^1$ to $X^{12}$ each independently represent a hydrogen atom and both of $K^1$ and $K^2$ represent a benzene ring.

5. The liquid crystal composition according to claim 1, containing at least one liquid crystal compound represented by the following formula (2) as the liquid crystal compound:

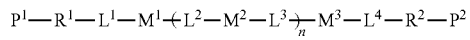

Formula (2)

wherein $P^1$ and $P^2$ each independently represent a hydrogen atom or a polymerizable group, $R^1$ and $R^2$ each independently represent an alkylene group having 1 to 8 carbon atoms, an alkynylene group having 2 to 8 carbon atoms, or an alkenylene group having 2 to 8 carbon atoms; $L^1$ to $L^4$ each independently represent a single bond, O, S, COO, OCO, OCOO, CO, $NR^3$, $NR^4CO$, or $CONR^5$ in which $R^3$ to $R^5$ each independently represent an alkyl group having 1 to 4 carbon atoms; $M^1$ to $M^3$ each independently represent a phenylene group, a biphenylene group, a naphthylene group, a cyclohexylene group, or a cyclohexenylene group, one or more carbon atoms among carbon atoms constituting each ring may be substituted with a nitrogen atom, and a hydrogen atom on each ring may be substituted with a halogen atom, an alkyl group having 1 to 8 carbon atoms, an alkynyl group having 2 to 8 carbon atoms, an alkenyl group having 2 to 8 carbon atoms, or an alkyloxy group having 1 to 8 carbon atoms in which each $CH_2$ group in the alkyl group, the alkynyl group, the alkenyl group and the alkyloxy group may be independently substituted with O, S, OCO, COO, OCOO, or CO; and n represents an integer of 1 to 3.

6. The liquid crystal composition according to claim 5, containing at least two kinds of liquid crystal compounds represented by the formula (2) as the liquid crystal compound and both of $P^1$ and $P^2$ represent a polymerizable group in at least one kind of the at least two kinds of liquid crystal compounds.

7. The liquid crystal composition according to claim 5, containing at least two kinds of the liquid crystal compounds represented by the formula (2) as the liquid crystal compound and one of $P^1$ and $P^2$ represents a hydrogen atom and the other represents a polymerizable group in at least one kind of the at least two kinds of liquid crystal compounds.

8. The liquid crystal composition according to claim 5, wherein at least one of $P^1$ and $P^2$ represent a polymerizable group represented by any of groups in the formula (3):

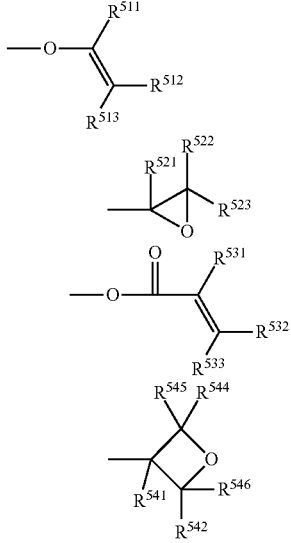

Groups of Formula (3)

wherein $R^{511}$ to $R^{513}$, $R^{521}$ to $R^{523}$, $R^{531}$ to $R^{533}$, and $R^{541}$ to $R^{545}$ each independently represent a hydrogen atom or an alkyl group.

9. The liquid crystal composition according to claim 5, wherein at least one of $P^1$ and $P^2$ in the formula (2) is a (meth)acrylate group.

10. The liquid crystal composition according to claim 5, wherein $L^1$ to $L^4$ each independently represent O, S, COO, OCO, or OCOO in the formula (2).

11. A polymer which is obtained by polymerizing a liquid crystal composition wherein the liquid crystal composition contains an optically active compound represented by the following formula (1) and a liquid crystal compound:

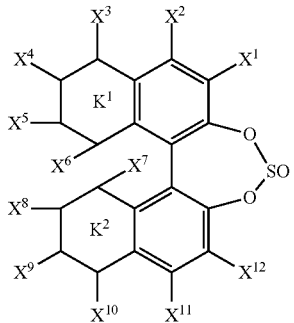

Formula (1)

wherein $K^1$ and $K^2$ each independently represent a benzene ring, a cyclohexane ring, or a cyclohexene ring, and one or more carbon atoms among carbon atoms constituting each ring may be substituted with a nitrogen atom; $X^1$ to $X^{12}$ each independently represent a hydrogen atom, a halogen atom, an alkyl group having 1 to 12 carbon atoms, an alkynyl group having 2 to 12 carbon atoms, an alkenyl group having 2 to 12 carbon atoms, or an alkyloxy group having 1 to 12 carbon atoms, and each $CH_2$ group in the alkyl group, the alkynyl group, the alkenyl group and the alkyloxy group may be independently substituted with O, S, OCO, COO, OCOO, CO, or a phenylene group.

12. A film which is obtained by curing a liquid crystal composition wherein the liquid crystal composition contains an optically active compound represented by the following formula (1) and a liquid crystal compound:

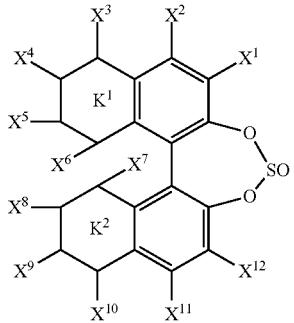

Formula (1)

wherein $K^1$ and $K^2$ each independently represent a benzene ring, a cyclohexane ring, or a cyclohexene ring, and one or more carbon atoms among carbon atoms constituting each ring may be substituted with a nitrogen atom; $X^1$ to $X^{12}$ each independently represent a hydrogen atom, a halogen atom, an alkyl group having 1 to 12 carbon atoms, an alkynyl group having 2 to 12 carbon atoms, an alkenyl group having 2 to 12 carbon atoms, or an alkyloxy group having 1 to 12 carbon atoms, and each $CH_2$ group in the alkyl group, the alkynyl group, the alkenyl group and the alkyloxy group may be independently substituted with O, S, OCO, COO, OCOO, CO, or a phenylene group.

13. A cholesteric liquid crystal which is formed of a liquid crystal composition wherein the liquid crystal composition contains an optically active compound represented by the following formula (1) and a liquid crystal compound:

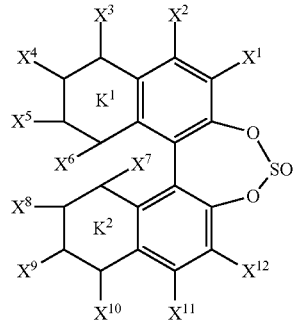

Formula (1)

wherein $K^1$ and $K^2$ each independently represent a benzene ring, a cyclohexane ring, or a cyclohexene ring, and one or more carbon atoms among carbon atoms constituting each ring may be substituted with a nitrogen atom; $X^1$ to $X^{12}$ each independently represent a hydrogen atom, a halogen atom, an alkyl group having 1 to 12 carbon atoms, an alkynyl group having 2 to 12 carbon atoms, an alkenyl group having 2 to 12 carbon atoms, or an alkyloxy group having 1 to 12 carbon atoms, and each $CH_2$ group in the alkyl group, the alkynyl group, the alkenyl group and the alkyloxy group may be independently substituted with O, S, OCO, COO, OCOO, CO, or a phenylene group.

14. A film which is obtained by fixing a cholesteric liquid crystal phase formed of a liquid crystal composition wherein the liquid crystal composition contains an optically active compound represented by the following formula (1) and a liquid crystal compound:

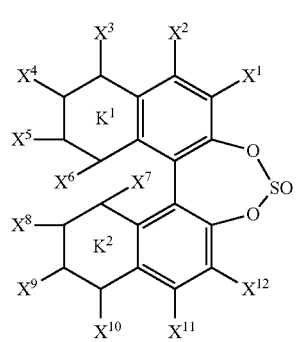

Formula (1)

wherein $K^1$ and $K^2$ each independently represent a benzene ring, a cyclohexane ring, or a cyclohexene ring, and one or more carbon atoms among carbon atoms constituting each ring may be substituted with a nitrogen atom; $X^1$ to $X^{12}$ each independently represent a hydrogen atom, a halogen atom, an alkyl group having 1 to 12 carbon atoms, an alkynyl group having 2 to 12 carbon atoms, an alkenyl group having 2 to 12 carbon atoms, or an alkyloxy group having 1 to 12 carbon atoms, and each $CH_2$ group in the alkyl group, the alkynyl group, the alkenyl group and the alkyloxy group may be independently substituted with O, S, OCO, COO, OCOO, CO, or a phenylene group.

15. The film according to claim 12, showing selective reflection characteristics.

* * * * *